(12) United States Patent
Jawali et al.

(10) Patent No.: US 11,878,389 B2
(45) Date of Patent: Jan. 23, 2024

(54) STRUCTURES FORMED USING AN ADDITIVE MANUFACTURING PROCESS FOR REGENERATING SURFACE TEXTURE IN SITU

(71) Applicant: Applied Materials, Inc., Santa Clara, CA (US)

(72) Inventors: Puneet Narendra Jawali, San Jose, CA (US); Veera Raghava Reddy Kakireddy, Santa Clara, CA (US); Rajeev Bajaj, Fremont, CA (US); Daniel Redfield, Morgan Hill, CA (US)

(73) Assignee: APPLIED MATERIALS, INC., Santa Clara, CA (US)

(*) Notice: Subject to any disclaimer, the term of this patent is extended or adjusted under 35 U.S.C. 154(b) by 237 days.

(21) Appl. No.: 17/172,152

(22) Filed: Feb. 10, 2021

(65) Prior Publication Data
US 2022/0250203 A1 Aug. 11, 2022

(51) Int. Cl.
*B24B 37/24* (2012.01)
*B33Y 80/00* (2015.01)
*B23K 26/342* (2014.01)

(52) U.S. Cl.
CPC ............ *B24B 37/24* (2013.01); *B23K 26/342* (2015.10); *B33Y 80/00* (2014.12)

(58) Field of Classification Search
CPC ...... B24D 15/02; B24D 15/023; B24B 37/24; B24B 37/22; B24B 37/20; B24B 37/245; B24B 37/26; B33Y 80/00; B23K 26/342
See application file for complete search history.

(56) References Cited

U.S. PATENT DOCUMENTS

| 2,001,911 | A | 5/1935 | Wooddell et al. |
| 3,357,598 | A | 12/1967 | Kraft |
| 3,741,116 | A | 6/1973 | Green et al. |

(Continued)

FOREIGN PATENT DOCUMENTS

| CN | 1400636 | 3/2003 |
| WO | 2020-153979 | 7/2020 |

OTHER PUBLICATIONS

International Search Report dated Apr. 28, 2022 for Application No. PCT/US2022/013403.

(Continued)

*Primary Examiner* — Joel D Crandall
(74) *Attorney, Agent, or Firm* — Patterson + Sheridan, LLP

(57) ABSTRACT

Embodiments of the present disclosure generally relate to structures formed using an additive manufacturing process, and more particularly, to polishing pads, and methods for manufacturing polishing pads, which may be used in a chemical mechanical polishing (CMP) process. The structures described herein are formed from a plurality of printed layers. The structure comprises a first material domain having a first material composition and a plurality of second material domains having a second material composition different from the first material composition. The first material domain is configured to have a first rate of removal and the plurality of second material domains are configured to have a different second rate of removal when an equivalent force is applied to a top surface of the first material domain and the plurality of second material domains.

12 Claims, 10 Drawing Sheets

(56) References Cited

U.S. PATENT DOCUMENTS

| | | |
|---|---|---|
| 4,459,779 A | 7/1984 | Shen |
| 4,575,330 A | 3/1986 | Hull |
| 4,836,832 A | 6/1989 | Tumey et al. |
| 4,841,680 A | 6/1989 | Hoffstein et al. |
| 4,844,144 A | 7/1989 | Murphy et al. |
| 4,942,001 A | 7/1990 | Murphy et al. |
| 4,960,673 A | 10/1990 | Beck et al. |
| 5,096,530 A | 3/1992 | Cohen |
| 5,120,476 A | 6/1992 | Scholz |
| 5,121,329 A | 6/1992 | Crump |
| 5,178,646 A | 1/1993 | Barber, Jr. et al. |
| 5,193,316 A | 3/1993 | Olmstead |
| 5,212,910 A | 5/1993 | Breivogel et al. |
| 5,287,663 A | 2/1994 | Pierce et al. |
| 5,300,417 A | 4/1994 | Lushington et al. |
| 5,378,527 A | 1/1995 | Nakanishi et al. |
| 5,470,368 A | 11/1995 | Culler |
| 5,533,923 A | 7/1996 | Shamouilian et al. |
| 5,605,499 A | 2/1997 | Sugiyama et al. |
| 5,605,760 A | 2/1997 | Roberts |
| 5,609,517 A | 3/1997 | Lofaro |
| 5,624,303 A | 4/1997 | Robinson |
| 5,626,919 A | 5/1997 | Chapman et al. |
| 5,645,471 A | 7/1997 | Strecker |
| 5,664,986 A | 9/1997 | Roh |
| 5,690,540 A | 11/1997 | Elliott et al. |
| 5,738,574 A | 4/1998 | Tolles et al. |
| 5,778,481 A | 7/1998 | Amsden et al. |
| 5,795,218 A | 8/1998 | Doan et al. |
| 5,876,268 A | 3/1999 | Lamphere et al. |
| 5,876,490 A | 3/1999 | Ronay |
| 5,888,121 A | 3/1999 | Kirchner et al. |
| 5,900,164 A | 5/1999 | Budinger et al. |
| 5,905,099 A | 5/1999 | Everaerts et al. |
| 5,906,863 A | 5/1999 | Lombardi et al. |
| 5,910,471 A | 6/1999 | Christianson et al. |
| 5,919,082 A | 7/1999 | Walker et al. |
| 5,921,855 A | 7/1999 | Osterheld et al. |
| 5,932,040 A | 8/1999 | Audisio |
| 5,932,290 A | 8/1999 | Lombardi et al. |
| 5,940,674 A | 8/1999 | Sachs et al. |
| 5,944,583 A | 8/1999 | Cruz et al. |
| 5,951,380 A | 9/1999 | Kim |
| 5,965,460 A | 10/1999 | Rach et al. |
| 5,976,000 A | 11/1999 | Hudson |
| 5,984,769 A | 11/1999 | Bennett et al. |
| 5,989,111 A | 11/1999 | Lamphere et al. |
| 5,989,470 A | 11/1999 | Doan et al. |
| 6,017,609 A | 1/2000 | Akamatsu et al. |
| 6,022,264 A | 2/2000 | Cook et al. |
| 6,029,096 A | 2/2000 | Manners et al. |
| 6,036,579 A | 3/2000 | Cook et al. |
| 6,062,968 A | 5/2000 | Sevilla et al. |
| 6,077,581 A | 6/2000 | Kuramochi et al. |
| 6,090,475 A | 7/2000 | Robinson et al. |
| 6,095,902 A | 8/2000 | Reinhardt |
| 6,117,000 A | 9/2000 | Anjur et al. |
| 6,121,143 A | 9/2000 | Messner et al. |
| 6,122,564 A | 9/2000 | Koch et al. |
| 6,126,532 A | 10/2000 | Sevilla et al. |
| 6,155,910 A | 12/2000 | Lamphere et al. |
| 6,176,992 B1 | 1/2001 | Talieh |
| 6,206,759 B1 | 3/2001 | Agarwal et al. |
| 6,210,254 B1 | 4/2001 | Cook et al. |
| 6,213,845 B1 | 4/2001 | Elledge |
| 6,228,133 B1 | 5/2001 | Thurber et al. |
| 6,231,629 B1 | 5/2001 | Christianson et al. |
| 6,231,942 B1 | 5/2001 | Blizard et al. |
| 6,241,596 B1 | 6/2001 | Osterheld et al. |
| 6,254,460 B1 | 7/2001 | Walker et al. |
| 6,257,973 B1 | 7/2001 | Fernand Guiselin |
| 6,267,641 B1 | 7/2001 | Vanell et al. |
| 6,273,806 B1 | 8/2001 | Bennett et al. |
| 6,309,276 B1 | 10/2001 | Tsai et al. |
| 6,309,282 B1 | 10/2001 | Wright et al. |
| 6,319,108 B1 | 11/2001 | Adefris et al. |
| 6,322,728 B1 | 11/2001 | Brodkin et al. |
| 6,325,706 B1 | 12/2001 | Krusell et al. |
| 6,328,634 B1 | 12/2001 | Shen et al. |
| 6,332,832 B1 | 12/2001 | Suzuki |
| 6,338,901 B1 | 1/2002 | Veerasamy |
| 6,361,411 B1 | 3/2002 | Chopra et al. |
| 6,361,832 B1 | 3/2002 | Agarwal et al. |
| 6,368,184 B1 | 4/2002 | Beckage |
| 6,390,890 B1 | 5/2002 | Molnar |
| 6,399,501 B2 | 6/2002 | Birang et al. |
| 6,402,604 B2 | 6/2002 | Guiselin |
| 6,423,255 B1 | 7/2002 | Hoechsmann et al. |
| 6,428,586 B1 | 8/2002 | Yancey |
| 6,454,634 B1 | 9/2002 | James et al. |
| 6,477,926 B1 | 11/2002 | Swisher et al. |
| 6,488,570 B1 | 12/2002 | James et al. |
| 6,500,053 B2 | 12/2002 | James et al. |
| 6,506,097 B1 | 1/2003 | Adams et al. |
| 6,518,162 B2 | 2/2003 | Ono et al. |
| 6,520,834 B1 | 2/2003 | Marshall |
| 6,520,847 B2 | 2/2003 | Osterheld et al. |
| 6,544,373 B2 | 4/2003 | Chen et al. |
| 6,548,407 B1 | 4/2003 | Chopra et al. |
| 6,569,373 B2 | 5/2003 | Napadensky |
| 6,582,283 B2 | 6/2003 | James et al. |
| 6,585,563 B1 | 7/2003 | Redeker et al. |
| 6,586,494 B2 | 7/2003 | Mejiritski et al. |
| 6,592,443 B1 | 7/2003 | Kramer et al. |
| 6,641,463 B1 | 11/2003 | Molnar |
| 6,641,471 B1 | 11/2003 | Pinheiro et al. |
| 6,645,061 B1 | 11/2003 | Bennett et al. |
| 6,682,402 B1 | 1/2004 | Roberts et al. |
| 6,684,704 B1 | 2/2004 | Obeng |
| 6,685,548 B2 | 2/2004 | Chen et al. |
| 6,692,338 B1 | 2/2004 | Kirchner |
| 6,699,115 B2 | 3/2004 | Osterheld et al. |
| 6,719,818 B1 | 4/2004 | Birang et al. |
| 6,736,709 B1 | 5/2004 | James et al. |
| 6,736,714 B2 | 5/2004 | Dudovicz |
| 6,746,225 B1 | 6/2004 | McHugh |
| 6,746,311 B1 | 6/2004 | Kessel |
| 6,749,485 B1 | 6/2004 | James et al. |
| 6,749,714 B1 | 6/2004 | Ishikawa et al. |
| 6,773,474 B2 | 8/2004 | Koehnle et al. |
| 6,783,436 B1 | 8/2004 | Muldowney |
| 6,790,883 B2 | 9/2004 | Ogawa et al. |
| 6,796,880 B2 | 9/2004 | Redeker et al. |
| 6,811,680 B2 | 11/2004 | Chen et al. |
| 6,811,937 B2 | 11/2004 | Lawton |
| 6,815,570 B1 | 11/2004 | Negiz et al. |
| 6,833,046 B2 | 12/2004 | Wright |
| 6,838,149 B2 | 1/2005 | Lugg |
| 6,840,843 B2 | 1/2005 | Jones et al. |
| 6,843,711 B1 | 1/2005 | Muldowney |
| 6,847,014 B1 | 1/2005 | Benjamin et al. |
| 6,855,588 B1 | 2/2005 | Liao et al. |
| 6,860,793 B2 | 3/2005 | Budinger et al. |
| 6,860,802 B1 | 3/2005 | Vishwanathan et al. |
| 6,866,807 B2 | 3/2005 | Comb et al. |
| 6,869,350 B2 | 3/2005 | Roberts et al. |
| 6,875,096 B2 | 4/2005 | Park et al. |
| 6,875,097 B2 | 4/2005 | Grunwald |
| 6,887,137 B2 | 5/2005 | Lee et al. |
| 6,896,593 B2 | 5/2005 | Prasad |
| 6,913,517 B2 | 7/2005 | Prasad |
| 6,935,931 B2 | 8/2005 | Prasad |
| 6,955,588 B1 | 10/2005 | Anderson, II et al. |
| 6,984,163 B2 | 1/2006 | Roberts |
| 6,991,517 B2 | 1/2006 | Redeker et al. |
| 6,991,528 B2 | 1/2006 | Hu et al. |
| 6,998,166 B2 | 2/2006 | Prasad |
| 7,018,560 B2 | 3/2006 | Liu et al. |
| 7,029,747 B2 | 4/2006 | Huh et al. |
| 7,044,836 B2 | 5/2006 | Sun et al. |
| 7,059,949 B1 | 6/2006 | Elmufdi et al. |
| 7,059,950 B1 | 6/2006 | Muldowney |
| 7,077,879 B2 | 7/2006 | Ogawa et al. |
| 7,120,512 B2 | 10/2006 | Kramer et al. |

(56) References Cited

U.S. PATENT DOCUMENTS

| | | |
|---|---|---|
| 7,125,318 B2 | 10/2006 | Muldowney |
| 7,132,033 B2 | 11/2006 | Boldizar et al. |
| 7,166,017 B2 | 1/2007 | Minamihaba et al. |
| 7,169,030 B1 | 1/2007 | Kulp |
| 7,186,164 B2 | 3/2007 | Manens |
| 7,186,322 B2 | 3/2007 | Sato et al. |
| 7,192,336 B2 | 3/2007 | Kramer et al. |
| 7,195,544 B2 | 3/2007 | Prasad |
| 7,204,742 B2 | 4/2007 | Prasad |
| 7,234,224 B1 | 6/2007 | Naugler et al. |
| 7,252,871 B2 | 8/2007 | Crkvenac et al. |
| 7,264,641 B2 | 9/2007 | Prasad |
| 7,267,607 B2 | 9/2007 | Prasad |
| 7,267,610 B1 | 9/2007 | Elmufdi et al. |
| 7,268,173 B2 | 9/2007 | Graichen et al. |
| 7,300,340 B1 | 11/2007 | Elmufdi et al. |
| 7,300,619 B2 | 11/2007 | Napadensky et al. |
| 7,311,590 B1 | 12/2007 | Muldowney |
| 7,311,862 B2 | 12/2007 | Prasad |
| 7,332,104 B2 | 2/2008 | Minamihaba et al. |
| 7,357,698 B2 | 4/2008 | Choi |
| 7,371,160 B1 | 5/2008 | Cruz et al. |
| 7,377,840 B2 | 5/2008 | Deopura et al. |
| 7,382,959 B1 | 6/2008 | Jacobsen |
| 7,425,172 B2 | 9/2008 | Misra et al. |
| 7,425,250 B2 | 9/2008 | Basol et al. |
| 7,427,340 B2 | 9/2008 | Mavliev et al. |
| 7,435,161 B2 | 10/2008 | Prasad et al. |
| 7,435,165 B2 | 10/2008 | Prasad |
| 7,438,636 B2 | 10/2008 | Kulp et al. |
| 7,438,795 B2 | 10/2008 | Wylie et al. |
| 7,445,847 B2 | 11/2008 | Kulp |
| 7,455,571 B1 | 11/2008 | Kuo et al. |
| 7,497,885 B2 | 3/2009 | Kollodge |
| 7,513,818 B2 | 4/2009 | Miller et al. |
| 7,517,277 B2 | 4/2009 | Muldowney |
| 7,517,488 B2 | 4/2009 | Saikin |
| 7,520,798 B2 | 4/2009 | Muldowney |
| 7,524,345 B2 | 4/2009 | Nevoret et al. |
| 7,530,880 B2 | 5/2009 | Bajaj et al. |
| 7,531,117 B2 | 5/2009 | Ederer et al. |
| 7,537,446 B2 | 5/2009 | James et al. |
| 7,582,127 B2 | 9/2009 | Vacassy et al. |
| 7,635,290 B2 | 12/2009 | Muldowney |
| 7,648,645 B2 | 1/2010 | Roberts et al. |
| 7,652,286 B2 | 1/2010 | Isobe et al. |
| 7,699,684 B2 | 4/2010 | Prasad |
| 7,704,122 B2 | 4/2010 | Misra et al. |
| 7,704,125 B2 | 4/2010 | Roy et al. |
| 7,731,568 B2 | 6/2010 | Shimomura et al. |
| 7,754,118 B2 | 7/2010 | Huh et al. |
| 7,762,870 B2 | 7/2010 | Ono et al. |
| 7,815,778 B2 | 10/2010 | Bajaj |
| 7,828,634 B2 | 11/2010 | Jiang et al. |
| 7,840,305 B2 | 11/2010 | Behr et al. |
| 7,846,008 B2 | 12/2010 | Bajaj |
| 7,871,309 B2 | 1/2011 | Ogawa et al. |
| 7,875,091 B2 | 1/2011 | Nevorct et al. |
| 7,926,521 B2 | 4/2011 | Izumoto et al. |
| 7,935,276 B2 | 5/2011 | Zhou et al. |
| 7,943,681 B2 | 5/2011 | Lee et al. |
| 7,976,901 B2 | 7/2011 | Kume et al. |
| 8,047,899 B2 | 11/2011 | Chen et al. |
| 8,053,487 B2 | 11/2011 | Ragain, Jr. et al. |
| 8,057,282 B2 | 11/2011 | Muldowney |
| 8,062,102 B2 | 11/2011 | Park et al. |
| 8,062,103 B2 | 11/2011 | Muldowney |
| 8,066,555 B2 | 11/2011 | Bajaj |
| 8,067,814 B2 | 11/2011 | Takehara et al. |
| 8,075,372 B2 | 12/2011 | Prasad |
| 8,075,745 B2 | 12/2011 | Bajaj |
| 8,083,820 B2 | 12/2011 | Kollodge et al. |
| 8,111,603 B2 | 2/2012 | Nishimura et al. |
| 8,118,641 B2 | 2/2012 | Kulp et al. |
| 8,142,860 B2 | 3/2012 | Vanmaele et al. |
| 8,142,869 B2 | 3/2012 | Kobayashi et al. |
| 8,172,648 B2 | 5/2012 | Lefevre et al. |
| 8,177,603 B2 | 5/2012 | Bajaj |
| 8,211,543 B2 | 7/2012 | Kato et al. |
| 8,257,545 B2 | 9/2012 | Loyack et al. |
| 8,260,447 B2 | 9/2012 | Mattes et al. |
| 8,282,866 B2 | 10/2012 | Hiraide |
| 8,287,793 B2 | 10/2012 | Deopura et al. |
| 8,288,448 B2 | 10/2012 | Kulp |
| 8,292,592 B2 | 10/2012 | Welch et al. |
| 8,292,692 B2 | 10/2012 | Bajaj |
| 8,337,282 B2 | 12/2012 | Park et al. |
| 8,349,706 B2 | 1/2013 | Noda |
| 8,377,623 B2 | 2/2013 | Fong |
| 8,380,339 B2 | 2/2013 | Misra et al. |
| 8,393,934 B2 | 3/2013 | Sung |
| 8,398,461 B2 | 3/2013 | Wang |
| 8,398,466 B2 | 3/2013 | Sung et al. |
| 8,409,976 B2 | 4/2013 | Hieslmair |
| 8,444,890 B2 | 5/2013 | Drury |
| 8,545,292 B2 | 10/2013 | Shinchi et al. |
| 8,546,717 B2 | 10/2013 | Stecker |
| 8,562,389 B2 | 10/2013 | Benvegnu et al. |
| 8,598,523 B2 | 12/2013 | Stecker et al. |
| 8,602,851 B2 | 12/2013 | Lombardo et al. |
| 8,647,179 B2 | 2/2014 | Nakayama et al. |
| 8,684,794 B2 | 4/2014 | Lefevre et al. |
| 8,690,978 B2 | 4/2014 | Amaud et al. |
| 8,702,479 B2 | 4/2014 | Huang et al. |
| 8,709,114 B2 | 4/2014 | Cantrell et al. |
| 8,715,035 B2 | 5/2014 | Roy et al. |
| 8,734,206 B2 | 5/2014 | Chang et al. |
| 8,784,721 B2 | 7/2014 | Philippi et al. |
| 8,801,949 B2 | 8/2014 | Lakrout et al. |
| 8,821,214 B2 | 9/2014 | Joseph |
| 8,845,852 B2 | 9/2014 | Nakamori et al. |
| 8,853,082 B2 | 10/2014 | Hanano et al. |
| 8,853,527 B2 | 10/2014 | Hieslmair |
| 8,864,859 B2 | 10/2014 | Roy et al. |
| 8,883,392 B2 | 11/2014 | Napadensky et al. |
| 8,888,480 B2 | 11/2014 | Yoo et al. |
| 8,894,799 B2 | 11/2014 | Lakrout |
| 8,932,116 B2 | 1/2015 | Deopura et al. |
| 8,932,511 B2 | 1/2015 | Napadensky |
| 8,968,058 B2 | 3/2015 | Kerprich et al. |
| 8,980,749 B1 | 3/2015 | Itai et al. |
| 8,986,585 B2 | 3/2015 | Cantrell et al. |
| 9,017,140 B2 | 4/2015 | Allison et al. |
| 9,033,764 B2 | 5/2015 | Kitamura et al. |
| 9,067,297 B2 | 6/2015 | Allison et al. |
| 9,067,298 B2 | 6/2015 | Lefevre et al. |
| 9,067,299 B2 | 6/2015 | Bajaj et al. |
| 9,068,085 B2 | 6/2015 | Kim et al. |
| 9,089,943 B2 | 7/2015 | Lipson |
| 9,108,291 B2 | 8/2015 | Lakrout |
| 9,126,304 B2 | 9/2015 | Kimura |
| 9,138,858 B2 | 9/2015 | Benvegnu et al. |
| 9,152,006 B2 | 10/2015 | Farrand et al. |
| 9,152,340 B2 | 10/2015 | Wu et al. |
| 9,156,124 B2 | 10/2015 | Allison et al. |
| 9,162,340 B2 | 10/2015 | Joseph et al. |
| 9,162,341 B2 | 10/2015 | LeFevre et al. |
| 9,211,628 B2 | 12/2015 | Allison et al. |
| 9,216,546 B2 | 12/2015 | DeSimone et al. |
| 9,254,545 B2 | 2/2016 | Park |
| 9,259,820 B2 | 2/2016 | Qian et al. |
| 9,259,821 B2 | 2/2016 | Qian et al. |
| 9,278,424 B2 | 3/2016 | Roy et al. |
| 9,296,085 B2 | 3/2016 | Bajaj et al. |
| 9,308,620 B2 | 4/2016 | Schutte et al. |
| 9,314,897 B2 | 4/2016 | Qian et al. |
| 9,333,620 B2 | 5/2016 | Qian et al. |
| 9,352,443 B2 | 5/2016 | Suen et al. |
| 9,375,821 B2 | 6/2016 | Chen et al. |
| 9,375,822 B2 | 6/2016 | Hsu et al. |
| 9,393,740 B2 | 7/2016 | Okamoto et al. |
| 9,421,666 B2 | 8/2016 | Krishnan et al. |
| 9,457,520 B2 | 10/2016 | Bajaj et al. |
| 9,469,800 B2 | 10/2016 | Jung |

(56) References Cited

U.S. PATENT DOCUMENTS

| | | |
|---|---|---|
| 9,481,069 B2 | 11/2016 | Chen et al. |
| 9,505,952 B2 | 11/2016 | Reiss et al. |
| 9,587,127 B2 | 3/2017 | Herlihy et al. |
| 9,630,249 B2 | 4/2017 | Toyserkani et al. |
| 9,669,512 B2 | 6/2017 | Bajaj et al. |
| 9,718,129 B2 | 8/2017 | Ljungblad et al. |
| 9,744,724 B2 | 8/2017 | Bajaj et al. |
| 9,776,361 B2 | 10/2017 | Krishnan et al. |
| 9,868,230 B2 | 1/2018 | Dikovsky et al. |
| 9,873,180 B2 | 1/2018 | Bajaj et al. |
| 9,950,405 B2 | 4/2018 | Deng |
| 9,951,054 B2 | 4/2018 | Li et al. |
| 9,956,314 B2 | 5/2018 | Skaria et al. |
| 9,993,907 B2 | 6/2018 | Murugesh et al. |
| 10,005,236 B2 | 6/2018 | Yudovin-Farber et al. |
| 10,016,877 B2 | 7/2018 | Krishnan et al. |
| 10,029,405 B2 | 7/2018 | Bajaj et al. |
| 10,086,500 B2 | 10/2018 | Orilall et al. |
| 10,220,487 B2 | 3/2019 | Roy et al. |
| 10,245,704 B2 | 4/2019 | Eilers et al. |
| 10,322,491 B2 | 6/2019 | Orilall et al. |
| 10,335,994 B2 | 7/2019 | Napadensky et al. |
| 10,384,330 B2 | 8/2019 | Bajaj et al. |
| 10,391,605 B2 | 8/2019 | Ganapathiappan et al. |
| 10,399,201 B2 | 9/2019 | Ganapathiappan et al. |
| 10,406,599 B2 | 9/2019 | Ljungblad et al. |
| 10,406,801 B2 | 9/2019 | Bell et al. |
| 10,456,886 B2 | 10/2019 | Ganapathiappan et al. |
| 10,483,235 B2 | 11/2019 | Chiao et al. |
| 10,493,691 B2 | 12/2019 | Krishnan et al. |
| 10,537,974 B2 | 1/2020 | Bajaj et al. |
| 10,593,574 B2 | 3/2020 | Fung et al. |
| 10,618,141 B2 | 4/2020 | Chockalingam et al. |
| 10,675,789 B2 | 6/2020 | Dikovsky et al. |
| 10,744,714 B2 | 8/2020 | Lopez et al. |
| 10,773,509 B2 | 9/2020 | Ng et al. |
| 10,821,573 B2 | 11/2020 | Bajaj et al. |
| 10,875,145 B2 | 12/2020 | Bajaj et al. |
| 10,875,153 B2 | 12/2020 | Bajaj et al. |
| 10,876,073 B2 | 12/2020 | Ishida |
| 10,919,123 B2 | 2/2021 | Hariharan et al. |
| 10,953,515 B2 | 3/2021 | Ganapathiappan et al. |
| 2001/0008830 A1 | 7/2001 | Tolles et al. |
| 2001/0020448 A1 | 9/2001 | Vaartstra et al. |
| 2001/0029151 A1 | 10/2001 | Chopra |
| 2001/0034089 A1 | 10/2001 | Yamazaki et al. |
| 2001/0041511 A1 | 11/2001 | Lack et al. |
| 2001/0046834 A1 | 11/2001 | Ramana et al. |
| 2002/0016139 A1 | 2/2002 | Hirokawa et al. |
| 2002/0058468 A1 | 5/2002 | Eppert et al. |
| 2002/0069591 A1 | 6/2002 | Yancey |
| 2002/0077036 A1 | 6/2002 | Roberts et al. |
| 2002/0083577 A1 | 7/2002 | Suzuki |
| 2002/0112632 A1 | 8/2002 | Faibish |
| 2002/0137450 A1 | 9/2002 | Osterheld et al. |
| 2002/0173248 A1 | 11/2002 | Doan et al. |
| 2003/0019570 A1 | 1/2003 | Chen et al. |
| 2003/0022611 A1 | 1/2003 | Bartlett et al. |
| 2003/0056870 A1 | 3/2003 | Comb et al. |
| 2003/0113509 A1 | 6/2003 | Lugg |
| 2003/0134581 A1 | 7/2003 | Wang et al. |
| 2003/0153253 A1 | 8/2003 | Hanamoto et al. |
| 2003/0153255 A1 | 8/2003 | Hasegawa et al. |
| 2003/0166381 A1 | 9/2003 | Lee et al. |
| 2003/0181137 A1 | 9/2003 | Redeker et al. |
| 2003/0205325 A1 | 11/2003 | Boyd et al. |
| 2003/0220061 A1 | 11/2003 | Prasad |
| 2004/0003895 A1 | 1/2004 | Amano et al. |
| 2004/0014413 A1 | 1/2004 | Kawahashi et al. |
| 2004/0033758 A1 | 2/2004 | Wiswesser |
| 2004/0055223 A1 | 3/2004 | Ono et al. |
| 2004/0058623 A1 | 3/2004 | Lin et al. |
| 2004/0092108 A1 | 5/2004 | Yajima et al. |
| 2004/0106367 A1 | 6/2004 | Walker et al. |
| 2004/0126575 A1 | 7/2004 | Yoshida et al. |
| 2004/0133298 A1 | 7/2004 | Toyserkani et al. |
| 2004/0154533 A1 | 8/2004 | Agarwal et al. |
| 2004/0171340 A1 | 9/2004 | Prasad |
| 2004/0173946 A1 | 9/2004 | Pfeifer et al. |
| 2004/0175451 A1 | 9/2004 | Maekawa et al. |
| 2004/0180611 A1 | 9/2004 | Tajima et al. |
| 2004/0187714 A1 | 9/2004 | Napadensky et al. |
| 2004/0198185 A1 | 10/2004 | Redeker et al. |
| 2004/0224616 A1 | 11/2004 | Shiho et al. |
| 2004/0266326 A1 | 12/2004 | Shiho et al. |
| 2005/0003189 A1 | 1/2005 | Bredt et al. |
| 2005/0016868 A1 | 1/2005 | Basol et al. |
| 2005/0020082 A1 | 1/2005 | Vishwanathan et al. |
| 2005/0032464 A1 | 2/2005 | Swisher et al. |
| 2005/0062900 A1 | 3/2005 | Kim |
| 2005/0086869 A1 | 4/2005 | Park et al. |
| 2005/0098540 A1 | 5/2005 | Prasad |
| 2005/0101228 A1 | 5/2005 | Prasad |
| 2005/0110853 A1 | 5/2005 | Gardner et al. |
| 2005/0112998 A1 | 5/2005 | Matsuo et al. |
| 2005/0124262 A1 | 6/2005 | Manens |
| 2005/0153634 A1 | 7/2005 | Prasad et al. |
| 2005/0171224 A1 | 8/2005 | Kulp |
| 2005/0194681 A1 | 9/2005 | Hu et al. |
| 2005/0215177 A1 | 9/2005 | Prasad |
| 2005/0227590 A1 | 10/2005 | Sung |
| 2005/0250431 A1 | 11/2005 | Shih et al. |
| 2005/0260928 A1 | 11/2005 | Huh et al. |
| 2005/0260939 A1 | 11/2005 | Andrews et al. |
| 2005/0261150 A1 | 11/2005 | Yonker et al. |
| 2005/0274627 A1 | 12/2005 | Wylie et al. |
| 2005/0276967 A1 | 12/2005 | Prasad |
| 2005/0284536 A1 | 12/2005 | Kojima et al. |
| 2006/0019587 A1 | 1/2006 | Deopura et al. |
| 2006/0024434 A1 | 2/2006 | Wang et al. |
| 2006/0052040 A1 | 3/2006 | Prasad |
| 2006/0079159 A1 | 4/2006 | Naujok et al. |
| 2006/0096179 A1 | 5/2006 | Lu et al. |
| 2006/0125133 A1 | 6/2006 | Huh et al. |
| 2006/0160478 A1 | 7/2006 | Donohue et al. |
| 2006/0185256 A1 | 8/2006 | Nevoret et al. |
| 2006/0189269 A1 | 8/2006 | Roy et al. |
| 2006/0192315 A1 | 8/2006 | Farr et al. |
| 2006/0226567 A1 | 10/2006 | James et al. |
| 2006/0252900 A1 | 11/2006 | Bowman et al. |
| 2006/0276109 A1 | 12/2006 | Roy et al. |
| 2007/0007698 A1 | 1/2007 | Sano |
| 2007/0009606 A1 | 1/2007 | Serdy et al. |
| 2007/0032170 A1 | 2/2007 | Halley et al. |
| 2007/0037486 A1 | 2/2007 | Kang et al. |
| 2007/0054599 A1 | 3/2007 | Taylor et al. |
| 2007/0093185 A1 | 4/2007 | Naik |
| 2007/0117393 A1 | 5/2007 | Tregub et al. |
| 2007/0128874 A1 | 6/2007 | Shida et al. |
| 2007/0128991 A1 | 6/2007 | Yoon et al. |
| 2007/0149096 A1 | 6/2007 | Nishimura et al. |
| 2007/0204420 A1 | 9/2007 | Hornby et al. |
| 2007/0212979 A1 | 9/2007 | Preston |
| 2007/0221287 A1 | 9/2007 | Izumoto |
| 2007/0235133 A1 | 10/2007 | Benassi |
| 2007/0235904 A1 | 10/2007 | Saikin |
| 2007/0243795 A1 | 10/2007 | Kobayashi et al. |
| 2007/0269987 A1 | 11/2007 | Nakano et al. |
| 2008/0004743 A1 | 1/2008 | Goers et al. |
| 2008/0009228 A1 | 1/2008 | Nagase et al. |
| 2008/0057845 A1 | 3/2008 | Prasad |
| 2008/0060734 A1 | 3/2008 | Stehle |
| 2008/0105818 A1 | 5/2008 | Cohen |
| 2008/0157436 A1 | 7/2008 | Patel et al. |
| 2008/0207100 A1 | 8/2008 | Roy et al. |
| 2008/0211141 A1 | 9/2008 | Deopura et al. |
| 2008/0220702 A1 | 9/2008 | Feng et al. |
| 2008/0255823 A1 | 10/2008 | Grant |
| 2008/0268760 A1 | 10/2008 | Bajaj et al. |
| 2008/0314878 A1 | 12/2008 | Cai et al. |
| 2009/0011679 A1 | 1/2009 | Bajaj et al. |
| 2009/0053976 A1 | 2/2009 | Roy et al. |
| 2009/0053983 A1 | 2/2009 | Hosaka et al. |
| 2009/0081927 A1 | 3/2009 | Grumbine et al. |

(56) References Cited

U.S. PATENT DOCUMENTS

| | | |
|---|---|---|
| 2009/0093201 A1 | 4/2009 | Kazuno et al. |
| 2009/0094902 A1 | 4/2009 | Hou |
| 2009/0105363 A1 | 4/2009 | Napadensky |
| 2009/0130956 A1 | 5/2009 | Ohta et al. |
| 2009/0133716 A1 | 5/2009 | Lee |
| 2009/0137121 A1 | 5/2009 | Hsu et al. |
| 2009/0169455 A1 | 7/2009 | Van Aert et al. |
| 2009/0206065 A1 | 8/2009 | Kruth et al. |
| 2009/0253353 A1 | 10/2009 | Ogawa et al. |
| 2009/0270019 A1 | 10/2009 | Bajaj |
| 2009/0308553 A1 | 12/2009 | Souzy et al. |
| 2009/0308739 A1 | 12/2009 | Riker et al. |
| 2009/0311955 A1 | 12/2009 | Kerprich et al. |
| 2009/0320379 A1 | 12/2009 | Jun et al. |
| 2009/0321979 A1 | 12/2009 | Hiraide |
| 2010/0007692 A1 | 1/2010 | Vanmaele et al. |
| 2010/0009612 A1 | 1/2010 | Park et al. |
| 2010/0011672 A1 | 1/2010 | Kincaid et al. |
| 2010/0087128 A1 | 4/2010 | Nakayama et al. |
| 2010/0112919 A1 | 5/2010 | Bonner et al. |
| 2010/0120249 A1 | 5/2010 | Hirose et al. |
| 2010/0120343 A1 | 5/2010 | Kato et al. |
| 2010/0130112 A1 | 5/2010 | Bajaj |
| 2010/0140850 A1 | 6/2010 | Napadensky et al. |
| 2010/0203815 A1 | 8/2010 | Bajaj |
| 2010/0210197 A1 | 8/2010 | Matsumura et al. |
| 2010/0221489 A1 | 9/2010 | Lappalainen et al. |
| 2010/0255254 A1 | 10/2010 | Culler et al. |
| 2010/0323050 A1 | 12/2010 | Kumagai et al. |
| 2011/0011217 A1 | 1/2011 | Kojima |
| 2011/0014858 A1 | 1/2011 | Tsai et al. |
| 2011/0045199 A1 | 2/2011 | Cong |
| 2011/0048772 A1 | 3/2011 | Han |
| 2011/0059247 A1 | 3/2011 | Kuzusako et al. |
| 2011/0077321 A1 | 3/2011 | Napadensky |
| 2011/0130077 A1 | 6/2011 | Litke et al. |
| 2011/0171890 A1 | 7/2011 | Nakayama et al. |
| 2011/0180952 A1 | 7/2011 | Napadensky |
| 2011/0183583 A1 | 7/2011 | Joseph |
| 2011/0204538 A1 | 8/2011 | Drury |
| 2011/0277789 A1 | 11/2011 | Benson |
| 2011/0277877 A1 | 11/2011 | Stehle |
| 2012/0094487 A1 | 4/2012 | Kranz et al. |
| 2012/0178348 A1 | 7/2012 | Hsu et al. |
| 2012/0178845 A1 | 7/2012 | Napadensky et al. |
| 2012/0281334 A1 | 11/2012 | Sasaki et al. |
| 2012/0302148 A1 | 11/2012 | Bajaj et al. |
| 2012/0315830 A1 | 12/2012 | Joseph et al. |
| 2013/0012108 A1 | 1/2013 | Li et al. |
| 2013/0017769 A1 | 1/2013 | Kimura |
| 2013/0019570 A1 | 1/2013 | Weible |
| 2013/0048018 A1 | 2/2013 | Wargo et al. |
| 2013/0052917 A1 | 2/2013 | Park |
| 2013/0055568 A1 | 3/2013 | Dusel et al. |
| 2013/0059506 A1 | 3/2013 | Qian et al. |
| 2013/0059509 A1 | 3/2013 | Deopura et al. |
| 2013/0102231 A1 | 4/2013 | Joseph et al. |
| 2013/0122705 A1 | 5/2013 | Babu et al. |
| 2013/0137350 A1 | 5/2013 | Allison et al. |
| 2013/0139851 A1 | 6/2013 | Sin et al. |
| 2013/0172509 A1 | 7/2013 | Pawloski et al. |
| 2013/0183824 A1 | 7/2013 | Kwon et al. |
| 2013/0212951 A1 | 8/2013 | Ahn et al. |
| 2013/0231032 A1 | 9/2013 | Swedek et al. |
| 2013/0247477 A1 | 9/2013 | Cantrell et al. |
| 2013/0283700 A1 | 10/2013 | Bajaj et al. |
| 2013/0287980 A1 | 10/2013 | Burdzy et al. |
| 2013/0307194 A1 | 11/2013 | Elsey |
| 2013/0309951 A1 | 11/2013 | Benvegnu et al. |
| 2013/0316081 A1 | 11/2013 | Kovalcik et al. |
| 2013/0327977 A1 | 12/2013 | Singh et al. |
| 2013/0328228 A1 | 12/2013 | Pettis et al. |
| 2014/0024216 A1 | 1/2014 | Stender et al. |
| 2014/0034229 A1 | 2/2014 | Xu |
| 2014/0048970 A1 | 2/2014 | Batchelder et al. |
| 2014/0065932 A1 | 3/2014 | Kazuno et al. |
| 2014/0109784 A1 | 4/2014 | Daems et al. |
| 2014/0117575 A1 | 5/2014 | Kemperle et al. |
| 2014/0127973 A1 | 5/2014 | Motoshima et al. |
| 2014/0163717 A1 | 6/2014 | Das et al. |
| 2014/0206268 A1 | 7/2014 | Lefevre et al. |
| 2014/0230170 A1 | 8/2014 | Patel |
| 2014/0239527 A1 | 8/2014 | Lee |
| 2014/0324206 A1 | 10/2014 | Napadensky |
| 2014/0364044 A1 | 12/2014 | Ahn et al. |
| 2014/0370214 A1 | 12/2014 | Araki et al. |
| 2014/0370788 A1 | 12/2014 | Nair |
| 2015/0024233 A1 | 1/2015 | Gunther |
| 2015/0031781 A1 | 1/2015 | Landers et al. |
| 2015/0037601 A1 | 2/2015 | Blackmore |
| 2015/0038066 A1 | 2/2015 | Huang et al. |
| 2015/0043122 A1 | 2/2015 | Eto et al. |
| 2015/0044951 A1 | 2/2015 | Bajaj et al. |
| 2015/0045928 A1 | 2/2015 | Perez et al. |
| 2015/0056421 A1 | 2/2015 | Yudovin-Farber et al. |
| 2015/0056892 A1 | 2/2015 | Vacassy et al. |
| 2015/0056895 A1 | 2/2015 | Fotou et al. |
| 2015/0061170 A1 | 3/2015 | Engel et al. |
| 2015/0065020 A1 | 3/2015 | Roy et al. |
| 2015/0072522 A1 | 3/2015 | Jung |
| 2015/0084238 A1 | 3/2015 | Bonassar et al. |
| 2015/0089881 A1 | 4/2015 | Stevenson et al. |
| 2015/0093977 A1 | 4/2015 | Deopura et al. |
| 2015/0115490 A1 | 4/2015 | Reinarz |
| 2015/0123298 A1 | 5/2015 | Napadensky |
| 2015/0126099 A1 | 5/2015 | Krishnan et al. |
| 2015/0129798 A1 | 5/2015 | Napadensky |
| 2015/0159046 A1 | 6/2015 | Dinega et al. |
| 2015/0174826 A1 | 6/2015 | Murugesh et al. |
| 2015/0216790 A1 | 8/2015 | Feng et al. |
| 2015/0221520 A1 | 8/2015 | Singh et al. |
| 2015/0252202 A1 | 9/2015 | Nerad |
| 2015/0375361 A1 | 12/2015 | Qian et al. |
| 2016/0052103 A1 | 2/2016 | Qian et al. |
| 2016/0068996 A1 | 3/2016 | Lau et al. |
| 2016/0101500 A1 | 4/2016 | Fung et al. |
| 2016/0107287 A1 | 4/2016 | Bajaj et al. |
| 2016/0107288 A1 | 4/2016 | Orilall et al. |
| 2016/0107290 A1 | 4/2016 | Bajaj et al. |
| 2016/0107295 A1 | 4/2016 | Bajaj et al. |
| 2016/0107381 A1* | 4/2016 | Krishnan ................ B24B 37/24 451/527 |
| 2016/0114458 A1 | 4/2016 | Bajaj et al. |
| 2016/0136787 A1* | 5/2016 | Bajaj ...................... B24D 3/28 51/298 |
| 2016/0176021 A1 | 6/2016 | Orilall et al. |
| 2016/0221145 A1 | 8/2016 | Huang et al. |
| 2016/0229023 A1 | 8/2016 | Lugg et al. |
| 2016/0236279 A1 | 8/2016 | Ashton et al. |
| 2016/0252813 A1 | 9/2016 | Kitson |
| 2016/0257856 A1 | 9/2016 | Reiss et al. |
| 2016/0271869 A1 | 9/2016 | Van De Vrie et al. |
| 2016/0279757 A1 | 9/2016 | Qian et al. |
| 2016/0346997 A1 | 12/2016 | Lewis et al. |
| 2016/0347002 A1 | 12/2016 | Bajaj et al. |
| 2016/0354901 A1 | 12/2016 | Krishnan et al. |
| 2016/0375546 A1 | 12/2016 | Pai et al. |
| 2017/0036320 A1 | 2/2017 | Prasad |
| 2017/0100817 A1 | 4/2017 | Ganapathiappan et al. |
| 2017/0120416 A1 | 5/2017 | Chockalingam et al. |
| 2017/0133252 A1* | 5/2017 | Fung ...................... B24B 49/16 |
| 2017/0136603 A1 | 5/2017 | Ganapathiappan et al. |
| 2017/0148539 A1 | 5/2017 | Prestayko et al. |
| 2017/0151648 A1 | 6/2017 | Huang et al. |
| 2017/0173865 A1 | 6/2017 | Dikovsky et al. |
| 2017/0182629 A1 | 6/2017 | Lehuu et al. |
| 2017/0203406 A1* | 7/2017 | Ganapathiappan .... B33Y 10/00 |
| 2017/0203408 A1* | 7/2017 | Ganapathiappan ..... B24B 37/24 |
| 2017/0203409 A1 | 7/2017 | Lefevre et al. |
| 2017/0239886 A1 | 8/2017 | Norikane |
| 2017/0259396 A1* | 9/2017 | Yamamura ............. B33Y 30/00 |
| 2017/0259499 A1 | 9/2017 | Ng et al. |
| 2017/0274498 A1 | 9/2017 | Oh et al. |
| 2018/0043613 A1 | 2/2018 | Krishnan et al. |

(56) References Cited

U.S. PATENT DOCUMENTS

| | | |
|---|---|---|
| 2018/0100073 A1 | 4/2018 | Chopra et al. |
| 2018/0100074 A1 | 4/2018 | Chopra et al. |
| 2018/0100075 A1 | 4/2018 | Chopra et al. |
| 2018/0158707 A1 | 6/2018 | Hunter et al. |
| 2018/0161953 A1 | 6/2018 | Chen et al. |
| 2018/0161954 A1 | 6/2018 | Bajaj et al. |
| 2018/0229343 A1 | 8/2018 | Kim et al. |
| 2018/0236632 A1 | 8/2018 | Murugesh et al. |
| 2018/0339397 A1 | 11/2018 | Redfield |
| 2018/0339402 A1 | 11/2018 | Redfield et al. |
| 2018/0339447 A1 | 11/2018 | Redfield |
| 2018/0340104 A1 | 11/2018 | Hampson et al. |
| 2018/0371276 A1 | 12/2018 | Miyano |
| 2019/0030678 A1 | 1/2019 | Kumar et al. |
| 2019/0039204 A1 | 2/2019 | Chockalingam et al. |
| 2019/0047112 A1 | 2/2019 | Fu et al. |
| 2019/0202024 A1 | 7/2019 | Ganapathiappan et al. |
| 2019/0218697 A1 | 7/2019 | Nakayama et al. |
| 2019/0224809 A1 | 7/2019 | Ganapathiappan et al. |
| 2019/0299357 A1 | 10/2019 | Orilall et al. |
| 2019/0299537 A1 | 10/2019 | Mcclintock et al. |
| 2019/0337117 A1 | 11/2019 | Ganapathiappan et al. |
| 2020/0001433 A1 | 1/2020 | Bajaj et al. |
| 2020/0055161 A1 | 2/2020 | Chockalingham et al. |
| 2020/0070302 A1 | 3/2020 | Ganapathiappan et al. |
| 2020/0101657 A1 | 4/2020 | Krishnan et al. |
| 2020/0135517 A1 | 4/2020 | Fung et al. |
| 2020/0147750 A1 | 5/2020 | Bajaj et al. |
| 2020/0156311 A1 | 5/2020 | Rolland et al. |
| 2020/0230781 A1 | 7/2020 | Chockalingam et al. |
| 2020/0299834 A1 | 9/2020 | Bajaj et al. |
| 2020/0325353 A1 | 10/2020 | Sridhar et al. |
| 2020/0353586 A1 | 11/2020 | Moyer et al. |
| 2021/0013014 A1 | 1/2021 | Sarode Vishwanath |
| 2021/0039167 A1 | 2/2021 | Ashton et al. |
| 2021/0107116 A1 | 4/2021 | Bajaj et al. |
| 2021/0187822 A1 | 6/2021 | Yudovin-Farber et al. |
| 2021/0220857 A1 | 7/2021 | Baker et al. |

OTHER PUBLICATIONS

U.S. Appl. No. 17/036,623, filed Sep. 29, 2020, entitled "Polishing Pads Having Selectively Arranged Porosity".

U.S. Appl. No. 16/906,992, filed Jun. 19, 2020, entitled "Advanced Polishing Pads and Related Polishing Pad Manufacturing Methods".

\* cited by examiner

STRUCTURES FORMED USING AN ADDITIVE MANUFACTURING PROCESS FOR REGENERATING SURFACE TEXTURE IN SITU

BACKGROUND

Field

Embodiments of the present disclosure generally relate to structures formed using an additive manufacturing process, and more particularly, to polishing pads used for chemical mechanical polishing (CMP) of a substrate in an electronic device fabrication process.

Description of the Related Art

Chemical mechanical polishing (CMP) is a conventional process that has been used in many different industries to planarize surfaces of substrates. For example, CMP is commonly used in the manufacturing of high-density integrated circuits to planarize or polish a layer of material deposited on a semiconductor substrate. During a CMP process, a substrate, such as a silicon wafer, is mounted on a carrier head with the device surface placed against a rotating polishing pad. The carrier head provides a controllable load on the substrate to push the device surface against the polishing pad. A polishing liquid, such as slurry with abrasive particles, is supplied to the surface of the moving polishing pad and polishing head. The polishing pad and polishing head apply mechanical energy to the substrate, while the pad also helps to control the transport of slurry which interacts with the substrate during the polishing process.

Polishing pads have surface micro-texture or asperities which allow for abrasive capture and slurry transport and affect surface mechanical properties. The surface texture and surface and bulk mechanical properties of a polishing pad (e.g., elasticity, rebound, hardness, and stiffness), and the CMP processing conditions have a significant impact on the CMP polishing performance on both an integrated circuit (IC) die level (microscopic/nanoscopic) and a wafer or global level (macroscopic). For example, CMP process forces and conditions, such as pad compression, pad rebound, friction, changes in temperature during processing, and abrasive aqueous slurry chemistries impact polishing pad properties and thus CMP performance.

During each CMP processing step, a polishing pad is exposed to compression and rebound cycles, heating and cooling cycles, and abrasive slurry chemistries. Eventually the polishing pad becomes worn or "glazed" after polishing a certain number of substrates, and then needs to be replaced or reconditioned. A pad conditioning disk (e.g., diamond impregnated disk) is urged against and swept across the polishing surface at different times during the polishing process cycle to abrade and rejuvenate the surface of the polishing pad. The surface texture that is regenerated on conventional polishing pads using the pad conditioning disk is fundamentally random, and therefore highly unpredictable and difficult to control.

Accordingly, there is a need in the art for polishing pads and methods of manufacturing polishing pads that provide control of pad surface texture and regeneration of pad surface texture in situ. Such improvements are needed to yield improved polishing uniformity at both a microscopic level and macroscopic level, such as over the entire substrate.

SUMMARY

Embodiments of the present disclosure generally relate to structures formed using an additive manufacturing process, and more particularly, to polishing pads, and methods for manufacturing polishing pads, which may be used in a chemical mechanical polishing (CMP) process.

In one embodiment a structure includes a plurality of printed layers. The structure comprises a first material domain having a first material composition and a plurality of second material domains having a second material composition different from the first material composition. The first material domain is configured to have a first rate of removal and the plurality of second material domains are configured to have a different second rate of removal when an equivalent force is applied to a top surface of the first material domain and the plurality of second material domains.

In another embodiment a method of regenerating a surface texture includes altering a surface texture of a top surface of a structure comprising using the structure in one or more application-specific processes. The structure is formed from a plurality of printed layers, and prior to altering, the surface texture includes a plurality of exemplary features formed in the top surface of the structure. The method includes applying a process or force to the top surface of the structure to regenerate the surface texture including the plurality of exemplary features.

In another embodiment a structure includes a plurality of printed layers. The structure comprises a first material domain comprising a first plurality of sub-domains having a first material formulation and a second material domain comprising a second plurality of sub-domains having a second material formulation different from the first material formulation. At least a portion of the second material domain is configured to be selectively removed by a process or force applied to a top surface of the structure at a different rate than the first material domain to regenerate a surface texture on the top surface.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Embodiments described herein generally relate to structures formed using an additive manufacturing process, and more particularly, to polishing pads, and methods for manufacturing polishing pads, which may be used in a chemical mechanical polishing (CMP) process. In particular, the structures and polishing pads described herein feature spatially arranged material domains configured to regenerate surface texture in situ.

Generally, the methods set forth herein use an additive manufacturing system, e.g., a 2D or a 3D inkjet printer system, to form (print) at least portions of 3D printed structures in a layer-by-layer process. Typically, each print layer is formed (printed) by sequentially depositing and at least partially curing respective droplets of at least two different pre-polymer or other material compositions on a manufacturing support or a previously formed print layer. Beneficially, the additive manufacturing system and the methods set forth herein enable at least micron scale droplet placement control within each print layer (x-y resolution) as well as micron scale (0.1 μm to 200 μm) control over the thickness (z resolution) of each print layer. The micron scale x-y and z resolutions provided by the additive manufacturing systems and the methods set forth herein facilitate the formation of desired and repeatable patterns of at least two different material domains, each having unique properties and attributes. Thus, in some embodiments, the methods of forming 3D printed structures which are set forth herein also impart one or more distinctive structural characteristics of the 3D printed structures formed therefrom.

Embodiments disclosed herein provide control of pad surface texture and regeneration of pad surface texture in situ. These advantages are achieved at least in part by apparatus and/or methods disclosed herein which enable precise placement of materials with varied properties in a material matrix through additive manufacturing; tuning of the material matrix in each direction to facilitate the degree of material displacement during a conditioning process; and ability to predict and control post-process surface texture resulting from the conditioning process.

Figure 1A:
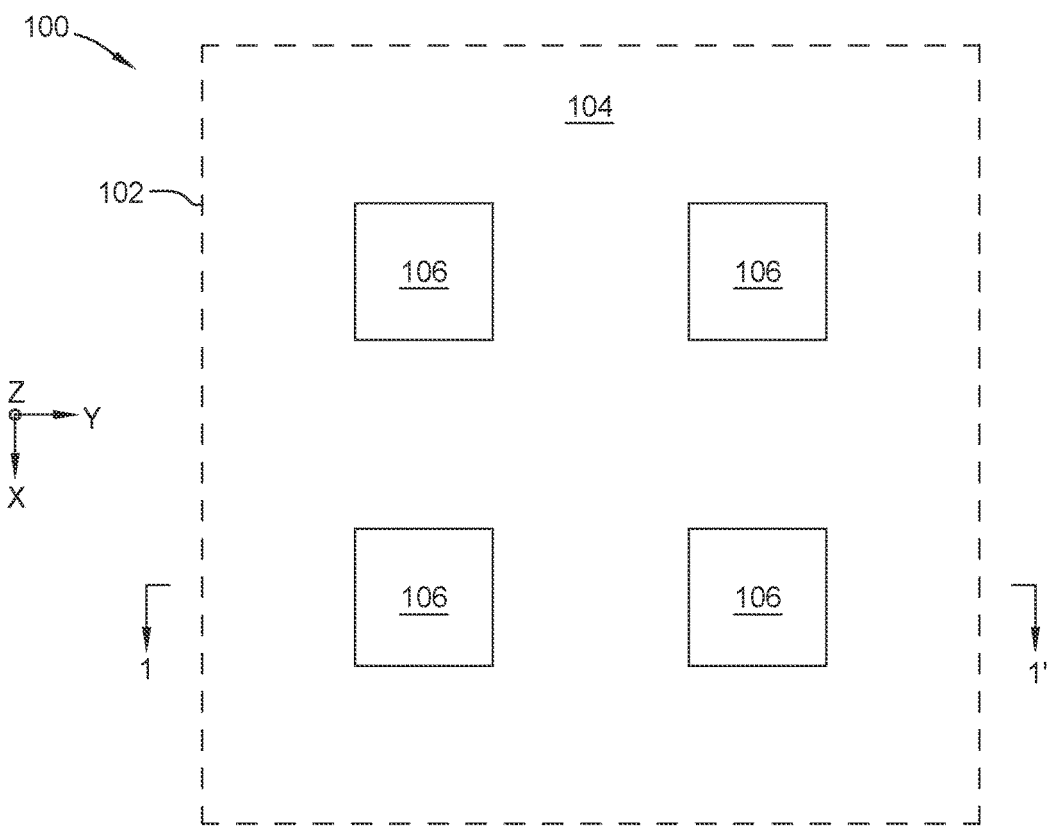
FIG. 1A is a schematic top view of a portion of a 3D printed structure, according to one or more embodiments described herein.

FIG. 1A is a schematic top view of a portion of a 3D printed structure 100, according to one or more embodiments described herein. A top surface 102 of the 3D printed structure 100 includes a first material domain 104 and a plurality of second material domains 106. As shown in FIG. 1A, the second material domains 106 have a square sectional shape when viewed from above. However, it is contemplated that the second material domains 106 may have any desired sectional shape when viewed from above, including irregular shapes. In certain embodiments, one or both of the first and second material domains 104, 106 have at least one lateral dimension (i.e., measured in the x-y plane) of about 100 μm or greater, such as about 100 μm to about 10 mm, such as about 100 μm to about 5 mm, such as about 100 μm to about 1 mm, such as about 100 μm to about 500 μm. In some embodiments, one or more lateral dimensions of the first and second material domains 104, 106 are varied across the top surface 102 to tune the hardness, mechanical strength, fluid transport characteristics, or other desirable properties thereof. It is contemplated that each domain 104, 106 may be formed from a single material or a composite of a plurality of different materials. In general, the first and second domains 104, 106 have different material formulations and/or different material properties. In certain embodiments, the first and second domains 104, 106 comprise one or more materials that differ. It is also contemplated that different material formulations may exist between the domains 104, 106 even when both domains 104, 106 include the same materials, or material composition, only at different relative concentrations and/or distributions within the respective domains. In certain embodiments, different material properties may depend on one or more process parameters such as differences in speed or duration of UV curing, which are described in more detail below with respect to FIG. 8A.

In FIG. 1A, the first and second domains 104, 106 are patterned such that the first domain 104 forms an interconnected network which spans substantially the entire length or width of the top surface 102 of the 3D printed structure 100. In contrast, the plurality of second domains 106 are interposed between regions of the first domain 104 and consist of discrete regions which are disconnected from one or more other regions of the same material. Although FIG. 1A illustrates an embodiment having one domain interposed between regions of another domain, the first and second domains 104, 106 are not particularly limited to the illustrated embodiment. For example, it is contemplated that both domains may be interconnected or both domains may consist of discrete regions. In certain embodiments, the pattern shown in FIG. 1A extends substantially across an entirety of the 3D printed structure 100.

Figure 1B:
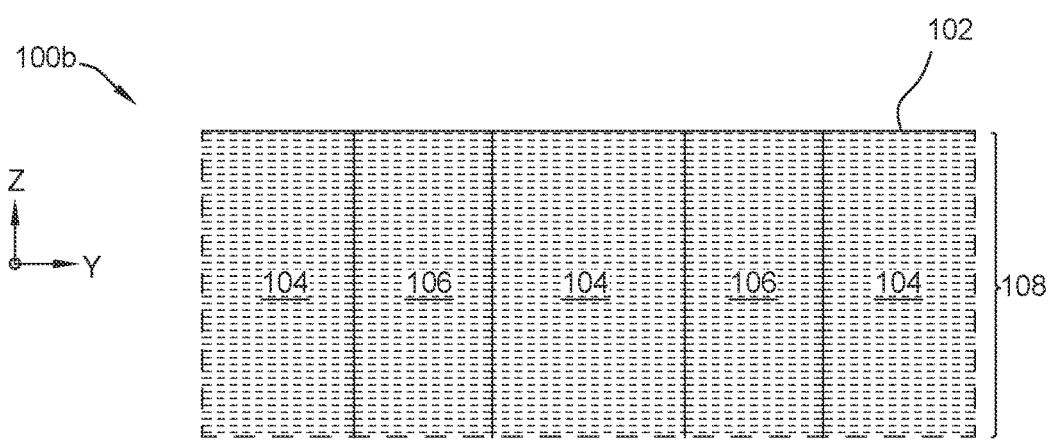
FIGS. 1B-1D are schematic cross-sectional views of a portion of a 3D printed structure taken along section line 1-1' of FIG. 1A, according to various embodiments described herein.
Figure 1C:
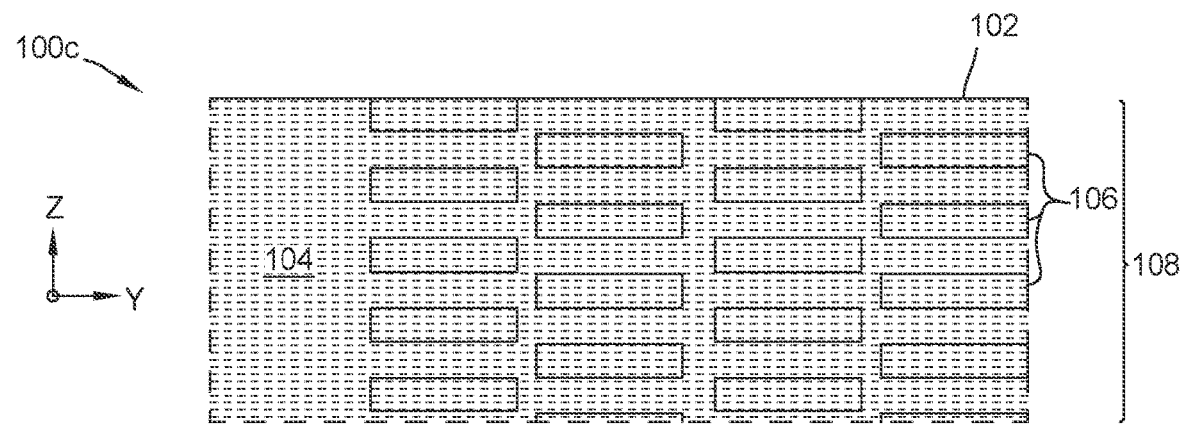
Figure 1D:
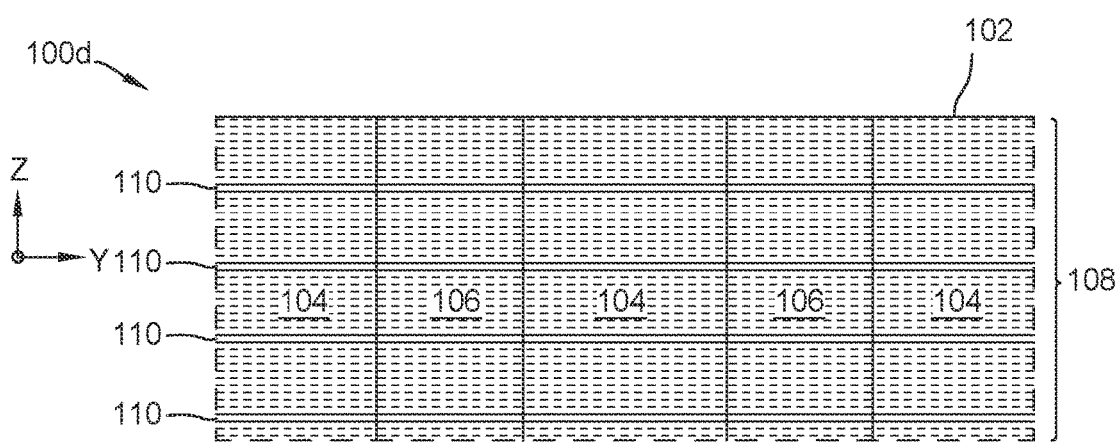

FIGS. 1B-1D are schematic cross-sectional views of a portion of a 3D printed structure 100 taken along section line 1-1' of FIG. 1A, according to various embodiments described herein. Referring collectively to FIGS. 1B-1D, the 3D printed structures 100b-d include a plurality of printed layers 108 which are stacked vertically (e.g., in the z-direction). It is contemplated that each printed layer 108 may have a thickness of about 2 μm to about 10 μm measured along the z-axis. Referring specifically to FIG. 1B, the plurality of printed layers 108 are identically mapped through uniform material placement in an x-y plane (i.e., laterally) such that each of the first and second domains 104, 106 is uniformly stacked in a vertical build plane orthogonal to the printed layer 108. Here, the x-y plane is horizontal and the z-axis is vertical. FIG. 1B illustrates that the plurality of printed layers 108 are aligned with each other in relation to the y-axis, and although not shown in FIG. 1B, the plurality of printed layers 108 are also aligned with each other in relation to the x-axis.

In contrast, referring specifically to FIG. 1C, the plurality of printed layers 108 are periodically or intermittently shifted in relation to the x-y plane such that the first and second domains 104, 106 are non-uniformly stacked in the vertical build plane. During a conditioning process with stress (e.g., a process or force) applied to the top surface 102 which is described in more detail below, intermittent shifting of the plurality of printed layers 108 puts a structural limit on the number and depth of layers which are removed. Therefore, the intermittent shifting adds an additional control knob to the conditioning process to regenerate the surface texture of the 3D printed structure 100c. In FIG. 1C, the position of the pattern is shifted every 5 layers or about 10 μm to about 50 μm. However, it is contemplated that the position may be shifted after any number of layers are formed. Although FIG. 1C shows that the shifting of the plurality of printed layers 108 is alternated back and forth between two positions in relation in to the y-axis, it is contemplated that the shifting of the plurality of printed layers 108 may be random or move serially in one direction. Although not shown in FIG. 1C, it is contemplated that in relation to the x-axis, the plurality of printed layers 108 may be either shifted or aligned with respect to each other without affecting the more general structural and functional differences between the embodiments of FIGS. 1B-1C, which are described in more detail below. Although FIG. 1C shows that the second domains 106 in adjacent sections are not overlapping, it is contemplated that some overlap may occur. However, it may be desirable to limit the overlap such that the number and depth of layers which are removed remains limited to only the section of the vertical build plane above the adjacent section of shifted layers.

Referring specifically to FIG. 1D, a plurality of low adhesion, or separation layers 110 are introduced into the 3D printed structure 100d. In FIG. 1D, the low adhesion layers 110 are oriented in the x-y plane. Bonding within each low adhesion layer 110, such as lateral cross-linking in the x-y plane, as well as forces of cohesion, adhesion or both, prevents each low adhesion layer 110 from separating or fracturing internally. However, vertical bonding between each low adhesion layer 110 and the surrounding layers 108 is relatively weak compared to the bonding within the low adhesion layer 110. Therefore, during a conditioning process with stress applied to the top surface 102 which is described in more detail below, an upper one of the plurality of low adhesion layers 110 is configured to separate from the surrounding layers 108 (due to weak bonding therebetween), and the low adhesion layer 110 is configured to be removed as a single sheet (due to relatively strong bonding within the low adhesion layer 110). In certain embodiments, the low adhesion layers 110 comprise a material which can be solubilized to further weaken the bonding between each low adhesion layer 110 and surrounding layers 108. Therefore, the effect is similar to the embodiment described above with respect to the 3D printed structure 100c, namely that the plurality of low adhesion layers 110 put a structural limit on the number and depth of layers which are removed during the conditioning process to regenerate the surface texture of the 3D printed structure 100d. The variable bonding strength which exists within and between layers may be selected to provide the 3D printed structure 100d with desired material properties and response to the conditioning process. It is contemplated that the difference in bonding strength between materials may be due to variable amounts of cross-linking. For example, it is contemplated that lateral cross-linking within the low adhesion layer 110 may exceed vertical cross-linking between the low adhesion layer 110 and the surrounding layers 108. It is contemplated that instead of being oriented in the x-y plane as shown in FIG. 1D, the low adhesion layers 110 may be oriented along the z-axis to cause vertical separation between different domains of the 3D printed structure.

Figure 2:
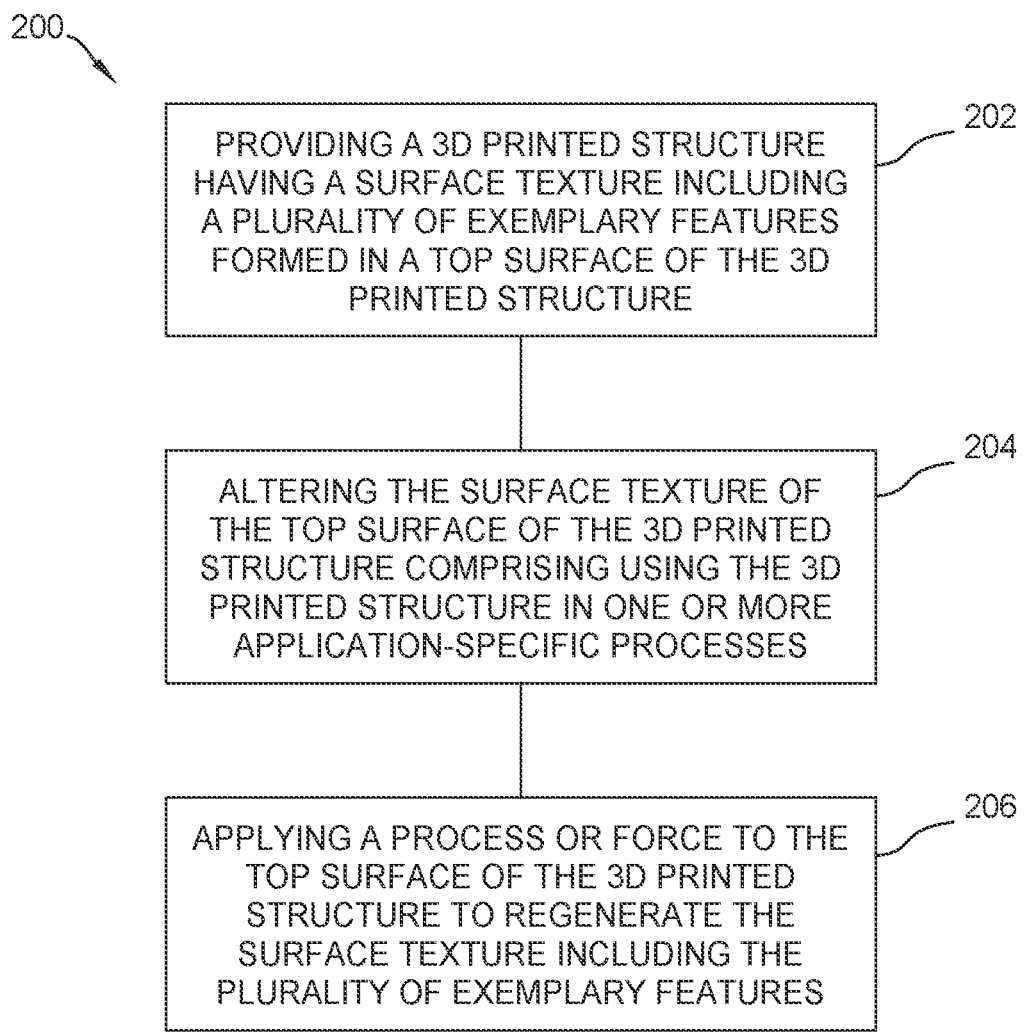
FIG. 2 is a diagram of a method for regenerating a surface texture of a 3D printed structure, according to one or more embodiments described herein.
Figure 3A:
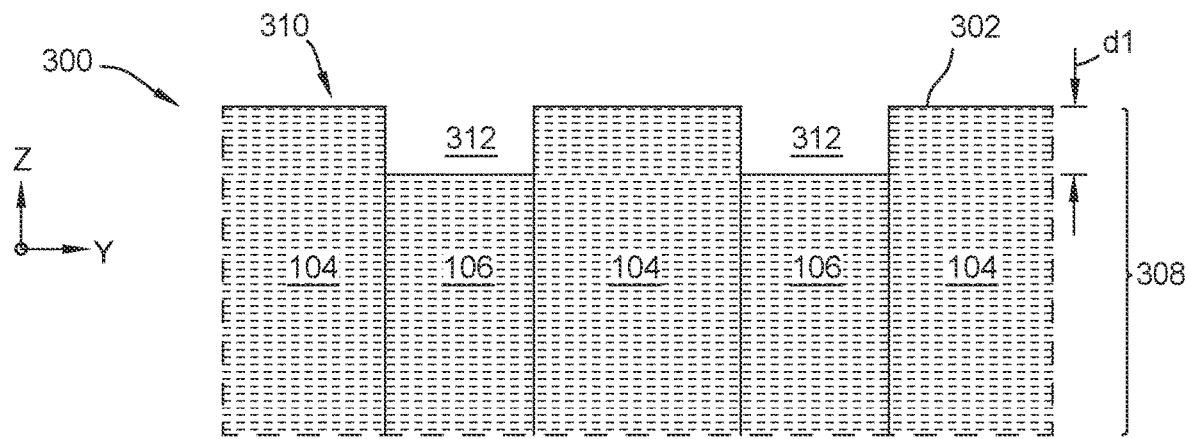
FIGS. 3A-3C are schematic cross-sectional views of a 3D printed structure at different stages of a method, according to one or more embodiments described herein.
Figure 3B:
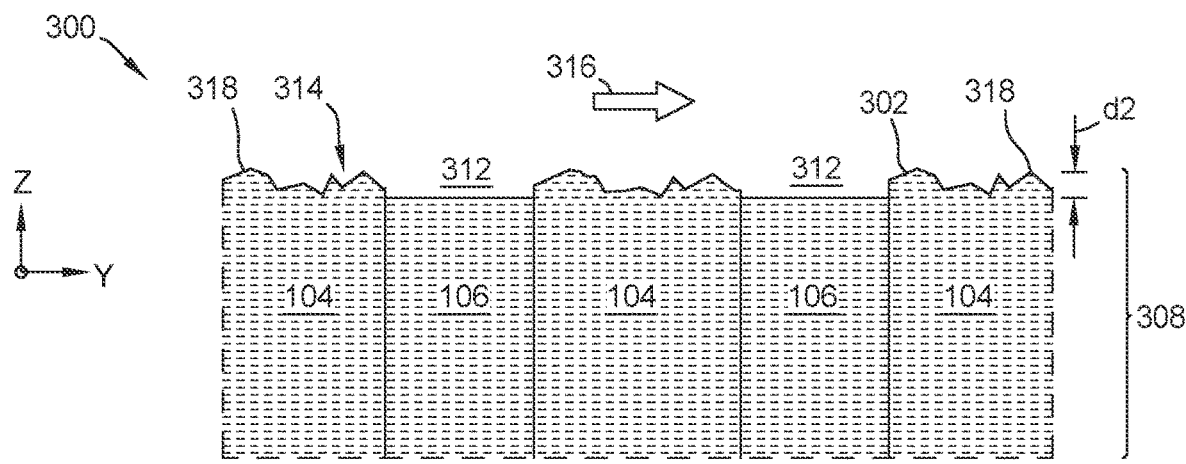
Figure 3C:
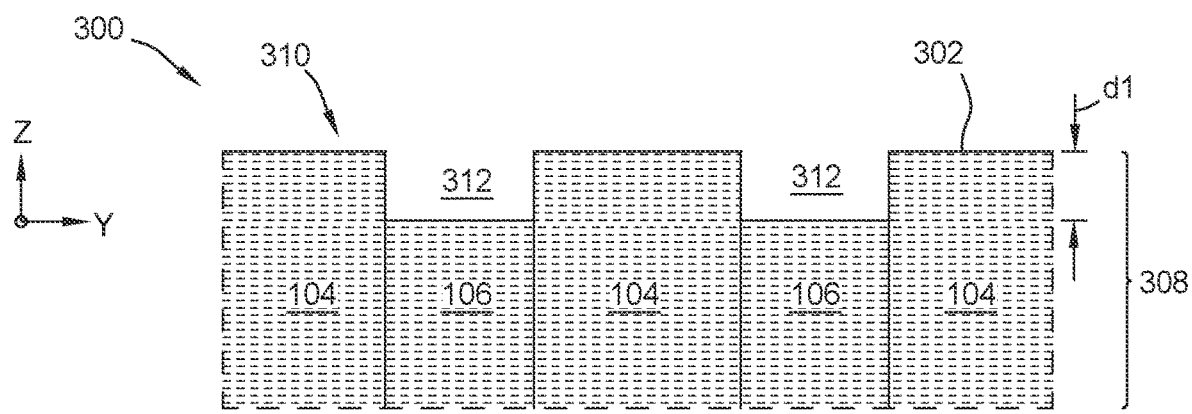

FIG. 2 is a diagram of a method 200 for regenerating a surface texture of a 3D printed structure 300, according to one or more embodiments. FIGS. 3A-3C are schematic cross-sectional views of the 3D printed structure 300 at different stages of the method 200, according to one or more embodiments. It is contemplated that apparatus and/or methods disclosed herein may be utilized in a variety of applications which would benefit by providing a 3D structure having a surface texture which may be regenerated in situ. For example, potential applications include CMP pads, precision optics, metal polish, advanced contact surface clean, tissue engineering, textured anti-microbial surfaces, drug delivery systems, and many others.

At operation 202 (FIG. 3A), a 3D printed structure 300 is provided which has a design surface texture 310, or surface profile, according to a design specification. Here, the design surface texture 310 includes a plurality of exemplary features, such as recesses 312, formed in the top surface 302. As shown in FIG. 3A, the top surface 302 is substantially flat in relation to x-y plane. In the embodiment illustrated in FIG. 3A, the recesses 312 have a design depth d1 of 10 layers or about 20 μm to about 100 μm. However, it is contemplated that the design depth d1 may be from 1 to 25 layers, such as 1 to 5 layers, such as 5 to 10 layers, such as 10 to 15 layers, such as 15 to 20 layers, such as 20 to 25 layers, which corresponds to a domain size of about 2 μm to about 250 μm. Although recesses 312 are illustrated in FIG. 3A, it is contemplated that other exemplary features may include wells, channels, or ridges, among others.

At operation 204 (FIG. 3B), the design surface texture 310 of the top surface 302 of the 3D printed structure 300 is altered from using the 3D printed structure 300 in one or more application-specific processes. As shown in FIG. 3B, the top surface 302 has an altered surface texture 314 in which the top surface 302 is no longer substantially flat in relation to the x-y plane. Instead, the top surface 302 has an undulating topology including a plurality of contact asperities 318. The term "contact asperity" as used herein refers to a particular portion of the top surface 302 which is configured to contact a substrate. Moreover, the depth of the recesses 312 is reduced from the design depth d1 to a lower depth d2.

At operation 206, a process or force 316 is applied to the top surface 302 of the 3D printed structure 300 to regenerate the design surface texture 310 including the plurality of exemplary features. The process or force 316 selectively removes layers 308 from the second domain 106 at a different rate than the first domain 104. For example, in the embodiment illustrated in FIG. 3C, the first domain 104 is planarized by a conventional abrasion process using a conditioning disk which flattens one or more contact asperities 318 and removes material from the top surface 302 without selectively lifting out entire layers from the first domain 104. On the other hand, application of the process or force 316 uniformly removes or lifts out one or more entire layers 308 from the second domain 106. In general, the dimensions in the x-y plane of the regions lifted from the second domain 106 to restore the recesses 312 are determined by the pattern of the plurality of printed layers 108. In contrast, it is contemplated that the vertical dimensions of the regions lifted from the second domain 106 may depend on one or more process parameters (e.g., shear force). Although FIG. 3C shows 10 layers being removed from the second domain 106, it is contemplated that the number of layers removed may be from 1 to 20 layers, such as 1 to 5 layers, such as 5 to 10 layers, such as 10 to 20 layers, or a number of layers which has a total thickness about equal to the design depth d1. In certain embodiments, only the top 2 µm to 10 µm are modified during the operation 206. In the embodiment illustrated in FIG. 3C, the number of layers removed from the second domain 106 is controlled by the magnitude of the process or force 316 which is applied to the top surface 302. For example, when a shear force is applied (FIG. 4A), the removal rate and/or removal depth depends on the magnitude of the shear force.

In certain other embodiments, the number of layers removed from the second domain 106 is at least partially controlled by structural limits imposed by intermittent shifting of the plurality of printed layers in relation to the x-y plane. For example, applying the same process or force 316 at operation 206 to the 3D printed structure 100c of FIG. 1C may result in only 5 layers of the second domain 106 being lifted out compared to the 10 layers lifted from the 3D printed structure 300 in FIG. 3C. Thus, the change in the pattern of the plurality of printed layers 108 shown in FIG. 1C effectively prevents the layers of the second domain 106 in the adjacent section from being removed during operation 206. In general, the result of applying the method 200 to the 3D printed structure 300 as described above is that the flat topology of the top surface 302 and the design depth d1 of the recesses 312 are restored to the design specification or some other desired specification.

Using apparatus and/or methods disclosed herein, the surface texture of a 3D printed structure, including the presence of one or more exemplary features therein, can be regenerated at any point in time by selectively removing, or displacing, a number of layers in certain regions of the surface via a process or force applied thereto. In other words, portions of one or more layers may be selectively removed while other portions of the same layers are retained. For example, in the embodiment illustrated in FIGS. 3A-3C, the second domain 106 is selectively removed while the first domain 104 is substantially retained. In general, the selective removal of certain portions is governed by placement of different materials in relation to each other, which may be referred to as the juxtaposition of the different materials. For example, the selective removal may depend on cohesion between molecules of the same material and adhesion between molecules of different materials, as well as the relative strength of the cohesive and adhesive forces. It is contemplated that modulation of material formulations and/or material properties (e.g., modulus, miscibility, solubility and bonding) may contribute to the varying degrees of material cohesion and adhesion. It is also contemplated that material cohesion and adhesion may be affected by relative charge of the materials, and altering charge property and/or charge density may enable additional control over the selective removal of certain materials. Because the foregoing effects depend on specific material types including their relative concentration, distribution and juxtaposition, differences in cohesion and adhesion may be designed into a 3D printed structure through material placement in the x-y plane (within layer) and the vertical build plane (between layers).

Using apparatus and/or methods disclosed herein, a low adhesion layer may be introduced into a 3D printed structure to enable selective removal of the low adhesion layer. Consequently, other layers attached to the 3D printed structure via the low adhesion layer are also selectively removed. For example, in the embodiment illustrated in FIG. 1D, removal of the upper low adhesion layer 110 results in removal of the plurality of printed layers 108 disposed between the upper low adhesion layer 110 and the top surface 102. This is one example of designing a fatigue point or weakness in the 3D printed structure through material placement.

In certain embodiments, the process or force 316 includes at least one of a shear force (FIG. 4A), a water jet process (FIG. 4B), or a radiation energy process (FIG. 4C), which are described in more detail below. In certain embodiments, more than one process or force 316 may be combined to help regenerate the design surface texture 310. For example, it is contemplated that a radiation process may be applied first to the top surface 302 to modify one or more material properties affecting cohesion or adhesion of at least one of the first and second domains 104, 106 (e.g., polymer cross-linking) in preparation for applying shear force to actually remove the affected layers 308. It is also contemplated that a water jet process may be applied first to the top surface 302 to partially solubilize one of the first or second domains 104, 106 in preparation for applying shear force to actually remove the affected layers 308.

Figure 4A:
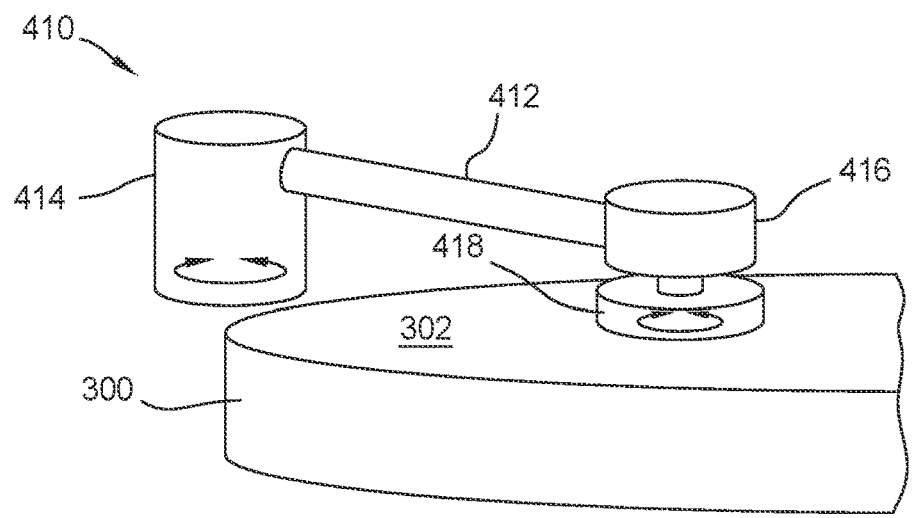
FIG. 4A is a schematic view of a pad conditioning assembly for applying shear force, according to one or more embodiments described herein.

FIG. 4A is a schematic view of an exemplary pad conditioning assembly 410 for applying shear force to the top surface 302. The pad conditioning assembly 410 includes a conditioning arm 412 and actuators 414 and 416 that are configured to cause a pad conditioning disk 418 (e.g., diamond impregnated disk) to be urged against and sweep across the top surface 302 of the 3D printed structure 300. In certain embodiments, the pad conditioning disk 418 has a hardness similar to diamond or silicon carbide such as having a Mohs scale rating of about 9 or greater.

Figure 4B:
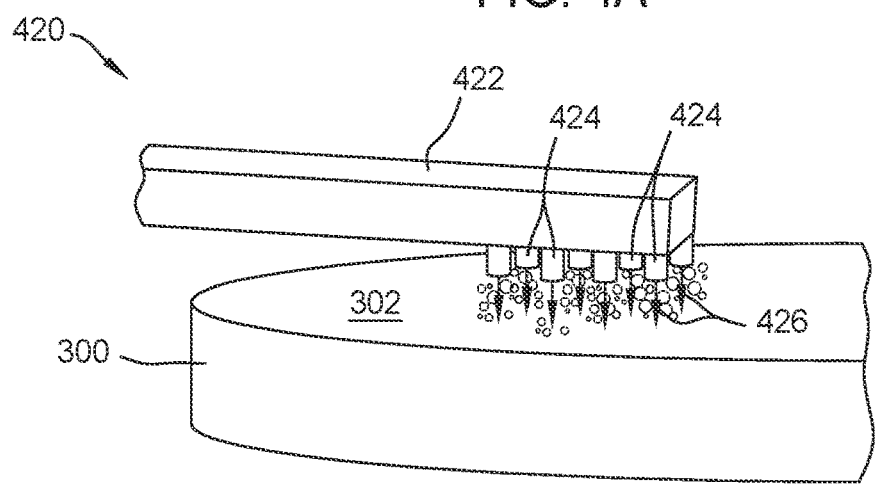
FIG. 4B is a schematic view of a water jet apparatus, according to one or more embodiments described herein.

FIG. 4B is a schematic view of an exemplary water jet apparatus 420. The water jet apparatus 420 includes an arm 422 having a plurality of nozzles 424 disposed at a distal end and configured to apply a water jet 426 to the top surface of the 3D printed structure 300.

Figure 4C:
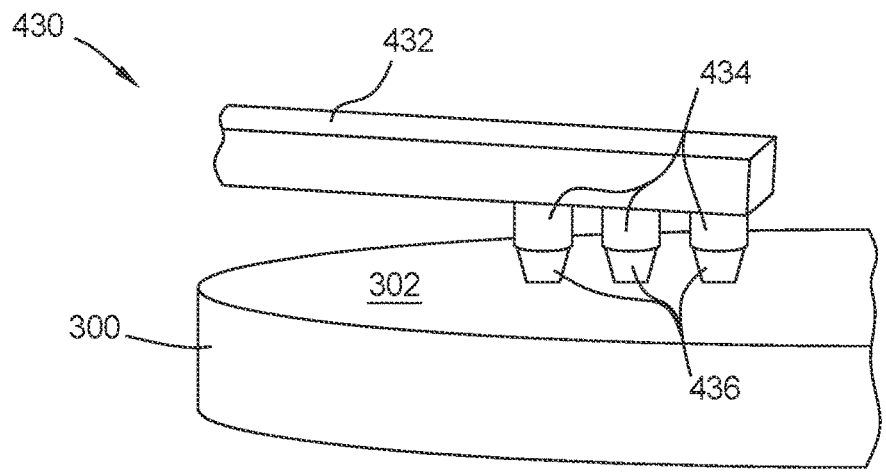
FIG. 4C is a schematic view of a radiation apparatus, according to one or more embodiments described herein.

FIG. 4C is a schematic view of an exemplary radiation apparatus 430. The apparatus 430 includes an arm 432 having a radiation source 434 disposed at a distal end and configured to generate radiation energy 436 which is directed towards the top surface 302 the 3D printed structure 300. In certain embodiments, the radiation energy 436 includes at least one of lasers, ultraviolet light, visible light, or microwaves, among others.

Polishing Pad Example

It is contemplated that CMP polishing pads for substrate processing may benefit from apparatus and/or methods disclosed herein. Although embodiments described herein are generally related to CMP pads used in semiconductor device manufacturing, the polishing pads and manufacturing methods thereof are also applicable to other polishing processes using both chemically active and chemically inactive polishing fluids and/or polishing fluids free from abrasive particles. In addition, embodiments described herein, alone or in combination, may be used in at least the following industries: aerospace, ceramics, hard disk drive (HDD), MEMS and Nano-Tech, metalworking, optics and electro-optics manufacturing, and semiconductor device manufacturing, among others.

Figure 5:
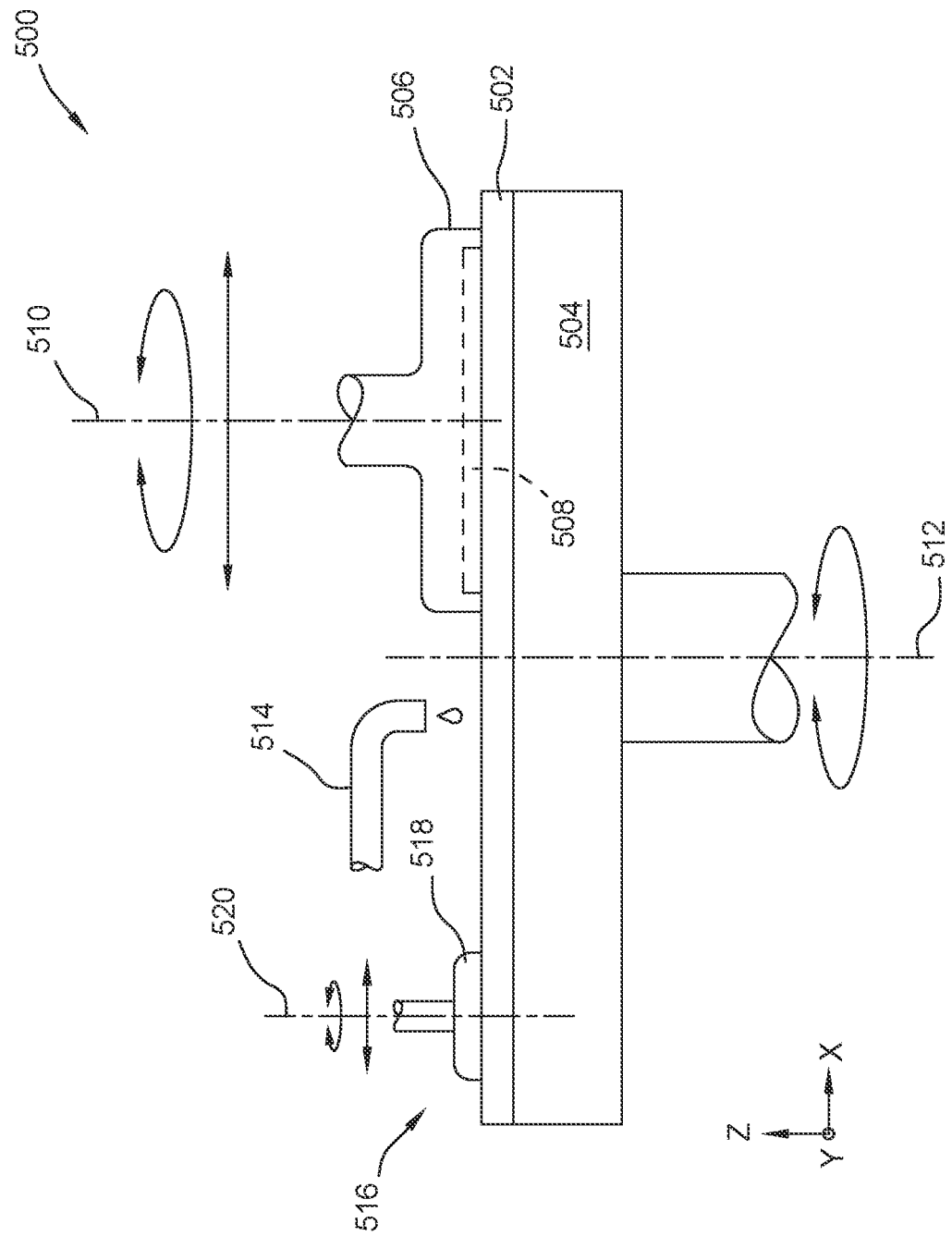
FIG. 5 is a schematic side view of a polishing system configured to use a polishing pad formed according to one or a combination of embodiments described herein.

FIG. 5 is a schematic side view of an example polishing system 500 configured to use a polishing pad formed according to one or a combination of embodiments described herein. Here, the polishing system 500 features a platen 504, having a polishing pad 502 secured thereto using a pressure sensitive adhesive, and a substrate carrier 506. The substrate carrier 506 faces the platen 504 and the polishing pad 502 mounted thereon. The substrate carrier 506 is used to urge a material surface of a substrate 508, disposed therein, against the polishing surface of the polishing pad 502 while simultaneously rotating about a carrier axis 510. The platen 504 rotates about a platen axis 512 while the rotating substrate carrier 506 sweeps back and forth from an inner diameter to an outer diameter of the platen 504 to, in part, reduce uneven wear of the polishing pad 502.

The polishing system 500 further includes a fluid delivery arm 514 and a pad conditioner assembly 516. The fluid delivery arm 514 is positioned over the polishing pad 502 and is used to deliver a polishing fluid, such as a polishing slurry having abrasives suspended therein, to a surface of the polishing pad 502. In certain embodiments, the polishing fluid contains a pH adjuster and other chemically active components, such as an oxidizing agent, to enable chemical mechanical polishing of the material surface of the substrate 508. The pad conditioner assembly 516 is used to condition the polishing pad 502 by urging a fixed abrasive conditioning disk 518 against the surface of the polishing pad 502 before, after, or during polishing of the substrate 508. Urging the conditioning disk 518 against the polishing pad 502 includes rotating the conditioning disk 518 about an axis 520 and sweeping the conditioning disk 518 from an inner diameter the platen 504 to an outer diameter of the platen 504. The conditioning disk 518 is used to abrade, rejuvenate, and remove polish byproducts or other debris from, the polishing surface of the polishing pad 502.

Figure 6A:
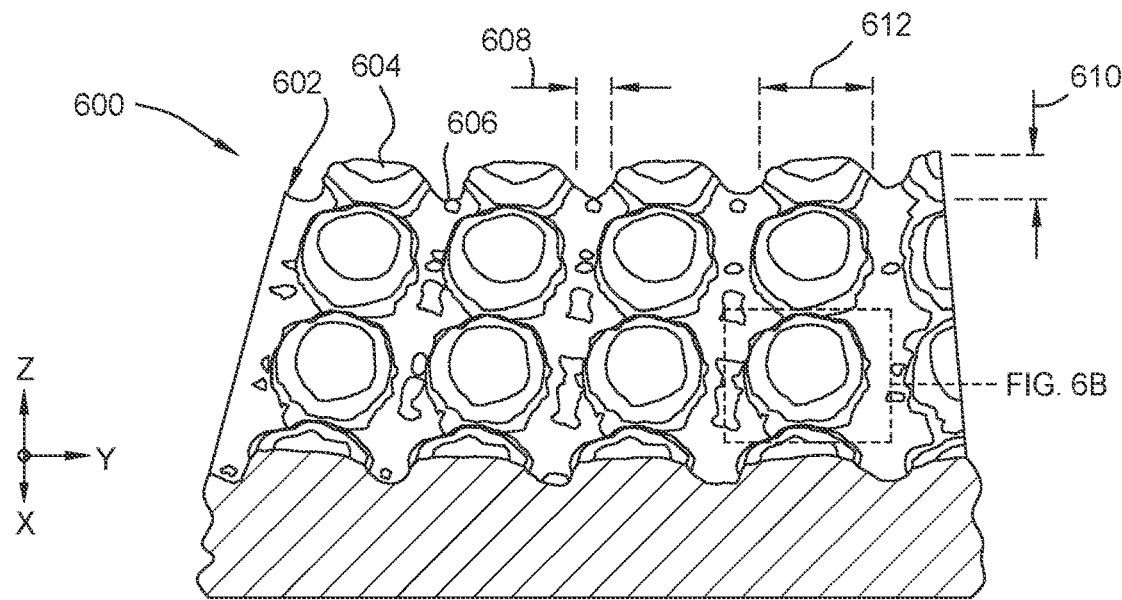
FIG. 6A is a schematic perspective sectional view of a portion of a polishing pad, according to one or more embodiments described herein.

FIG. 6A is a schematic perspective sectional view of a portion of an exemplary polishing pad 600, according to one or more embodiments described herein. FIG. 6A depicts a top surface, or polishing surface, 602 of the polishing pad 600 after regenerating the surface texture (e.g., after operation 206 of the method 200 of FIG. 2). In certain embodiments, the surface texture of the top surface 602 shown in FIG. 6A extends substantially across an entirety of the polishing pad 600. The top surface 602 of the polishing pad 600 comprises a plurality of polishing surfaces 604 which define a plurality of channels 606 therebetween. In general, the plurality of channels 606 are used to store and distribute slurry during a polishing process. The plurality of channels 606 include a plurality of major and minor channels which are aligned substantially orthogonally to each other. In the embodiment illustrated in FIG. 6A, the major channels are generally aligned in the direction of the x-axis and formed between adjacent polishing surfaces 604 which are spaced from each other along the y-axis. The minor channels are generally aligned in the direction of the y-axis and formed between adjacent polishing surfaces 604 which are spaced from each other along the x-axis. In certain embodiments, a width 608 of each of the plurality of channels 606 is about 100 µm to about 1000 µm, such as about 200 µm to about 800 µm, such as about 400 µm to about 600 µm, such as about 500 µm. In certain embodiments, a depth 610 of each of the plurality of channels 606 measured from a top of one of the plurality of polishing surfaces 604 to a bottom of an adjacent channel 606 is about 10 µm to about 100 µm, such as about 20 µm to about 80 µm, such as about 40 µm to about 60 µm, such as about 50 µm. In certain embodiments, a width 612 of each of the plurality of polishing surfaces 604 is about 200 µm to about 2000 µm, such as about 400 µm to about 1600 µm, such as about 800 µm to about 1200 µm, such as about 1000 µm.

Figure 6B:
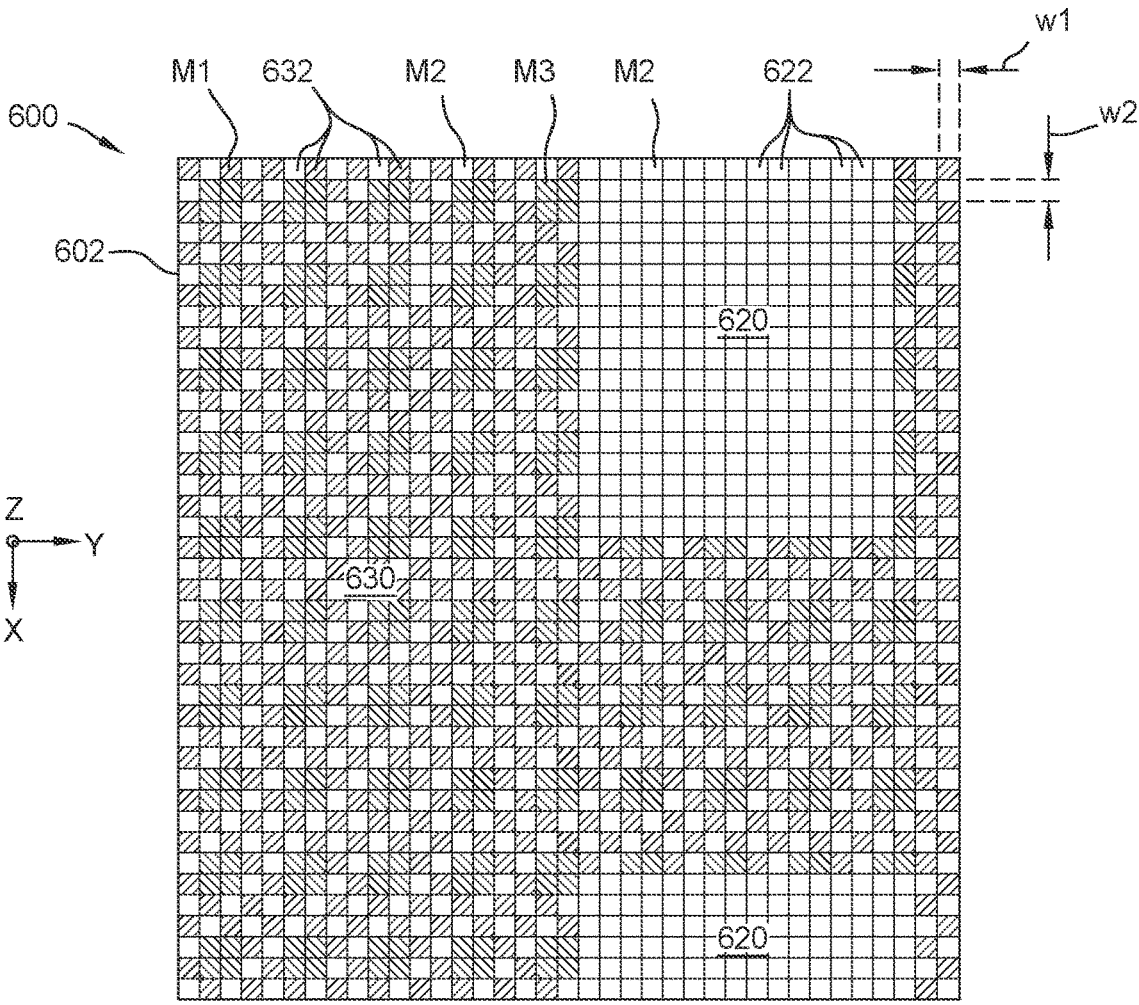
FIG. 6B is a schematic enlarged top view of a portion of a polishing pad surface of the polishing pad shown in FIG. 6A, according to one embodiment.

FIG. 6B is a schematic enlarged top view of a portion of the top surface 602 of the polishing pad 600 shown in FIG. 6A, according to one embodiment. In contrast to FIG. 6A, FIG. 6B depicts the top surface 602 of the polishing pad 600 before regenerating the surface texture (e.g., before operation 206 of the method 200 of FIG. 2). The portion of the polishing pad 600 shown in FIG. 6B features a continuous phase of polishing pad material formed of a plurality of first material domains 620 and a second material domain 630. Here, the spatially arranged first material domains 620 are interposed between regions of the second material domain 630. Each of the first material domains 620 corresponds to one of the plurality of polishing surfaces 604 shown in FIG. 6A. Likewise, the second material domain 630 corresponds to the plurality of channels 606 shown in FIG. 6A.

The first material domains 620 and second material domain 630 are formed from a plurality of individual sub-domains 622 and sub-domains 632, respectively. As shown in FIG. 6B, each sub-domain 622, 632 has a square sectional shape when viewed from above with a first lateral dimension w1 and a second lateral dimension w2. However, it is contemplated that the sub-domains 622, 632 may have any desired sectional shape when viewed from above, including irregular shapes. The lateral dimensions w1 and w2 are measured parallel to top the surface 602, and thus parallel to the supporting surface, of the polishing pad 600 in the x-y plane. The lateral dimensions w1 and w2 are defined by an additive manufacturing process which is described in more detail below. In certain embodiments, the lateral dimensions w1 and w2 are about 0.1 µm or greater, such as about 1 µm or greater, such as about 1 µm to about 40 µm. Each sub-domain 622, 632 depicted in the bitmap image of FIG. 6B corresponds to a single droplet deposited during the additive manufacturing process (described in more detail below). Therefore, each individual sub-domain 622, 632 has a characteristic material composition associated with a respective droplet, and the material composition may differ from that of one or more adjacent sub-domains 622, 632.

Figure 8A:
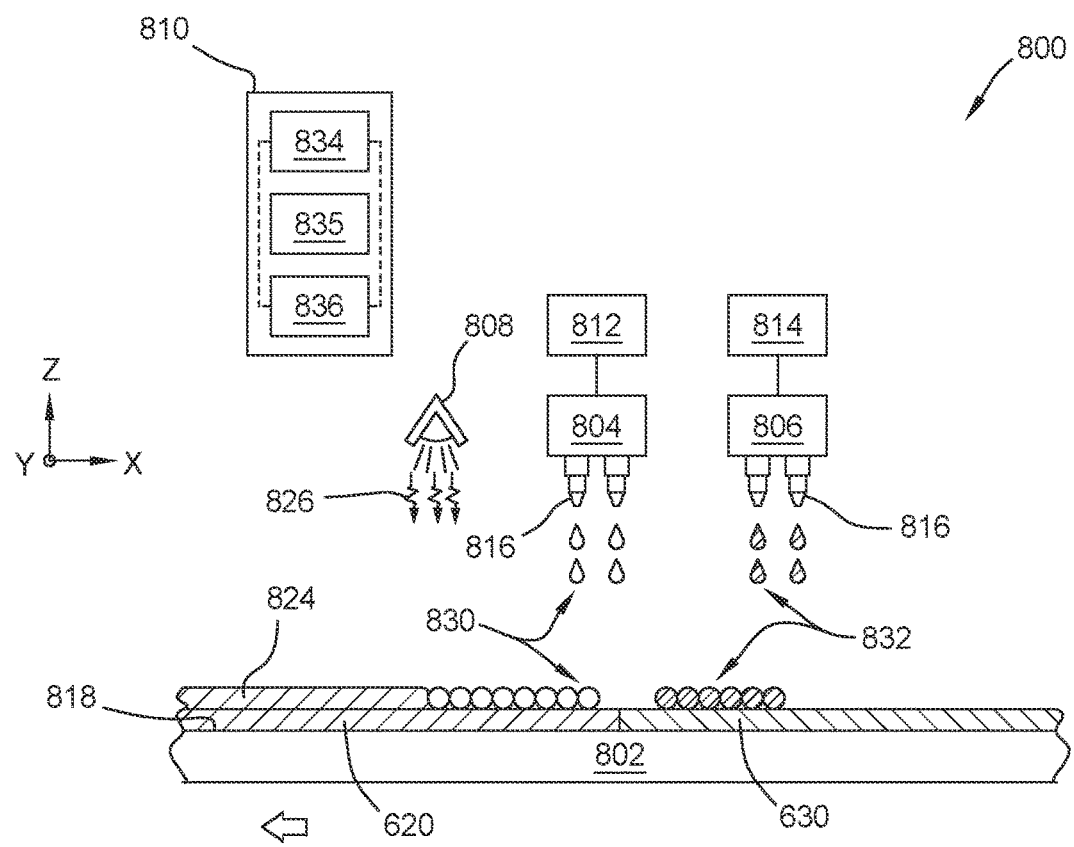
FIG. 8A is a schematic sectional view of an additive manufacturing system which may be used to manufacture polishing pads according to one or more, or a combination of, the embodiments described herein.

In certain embodiments, the first and second material domains 620, 630 are formed of different pre-polymer compositions, such as the example pre-polymer compositions set forth in the description of FIG. 8A, and thus comprise a difference from one another in one or more material properties. In some embodiments, which may be combined with other embodiments disclosed herein, one or more of the first and second material domains comprise at least one metal or ceramic material. In some embodiments, the storage modulus E' of the first material domains 620 and the second material domain 630 are different from one another, and the difference may be measured using a suitable measurement method, such as nanoindentation. In some embodiments, the plurality of first material domains 620 have a relativity low storage modulus E' and the second material domain 630 has a relatively medium or relativity high storage modulus E'. Characterizations of low, medium, and high storage modulus E' material domains at a temperature of about 30° C. (E'30) are summarized in Table 1.

TABLE 1

| | Low Storage Modulus Compositions | Medium Storage Modulus Compositions | High Storage Modulus Compositions |
|---|---|---|---|
| E'30 | <100 MPa, (e.g., 1 MPa-100 MPa) | 100 MPa-500 MPa | >500 MPa (e.g., 500 MPa-3000 MPa) |

In some embodiments, a ratio of the storage modulus E'30 between the first material domains 620 and the second material domain 630 is more than about 1:2, more than about 1:5, more than about 1:10, more than about 1:50, for example more than about 1:100. In some embodiments, the ratio of the storage modulus E'30 between the first material domains 620 and the second material domain 630 is more than about 1:500, for example more than about 1:1000.

In the embodiment illustrated in FIG. 6B, the first material domains 620 comprise only low modulus material M2 such that each of the individual sub-domains 622 within the first material domains 620 has the same material composition. Therefore, the storage modulus E' of the first material domains 620 is substantially equal to the storage modulus E' of each individual sub-domain 622. In contrast, the second material domain 630 comprises a mixed modulus composite in which the individual sub-domains 632 have a plurality of different material compositions. Here, the second material domain 630 comprises blocks of porogen material M3 interposed between regions having an alternating pattern of high modulus material M1 and low modulus material M2. The term "porogen" as used herein refers to any pore forming material composition such as a soluble sacrificial material which dissolves upon exposure to a conditioning fluid thus forming a corresponding plurality of pores within the second material domain 630. In certain embodiments, the porogen material M3 is evacuated with a liquid, such as water. The relative density and patterning of each of the individual sub-domains 632 determines the overall storage modulus E' of the second material domain 630. In some other embodiments (not shown), the second material domain 630 comprises only high modulus material M1.

Although FIG. 6B only shows the top layer of the polishing pad 600, it is contemplated that, when viewed from the side, the polishing pad 600 may have a structure similar to that of FIG. 1B, FIG. 1C or FIG. 1D. In other words, the first and second domains 620, 630 may be uniformly stacked between layers in the vertical build plane, the first and second domains 620, 630 may be intermittently shifted and non-uniformly stacked between layers in the vertical build plane, one or more low adhesion layers may be introduced between the first and second domains 620, 630 at selected depths along the vertical build plane, or combinations thereof.

Referring to FIG. 6B, during a conditioning process with stress (e.g., a process or force) applied to the top surface 602 (e.g., according to operation 206 of the method 200 of FIG. 2), the second domain 630 is selectively removed while the first domains 620 are substantially retained. Selective removal of the second domain 630 results in the structure shown in FIG. 6A. It is contemplated that stress may be applied using any apparatus described herein, such as one or more apparatus described with respect to FIGS. 4A-4C.

Figure 7A:
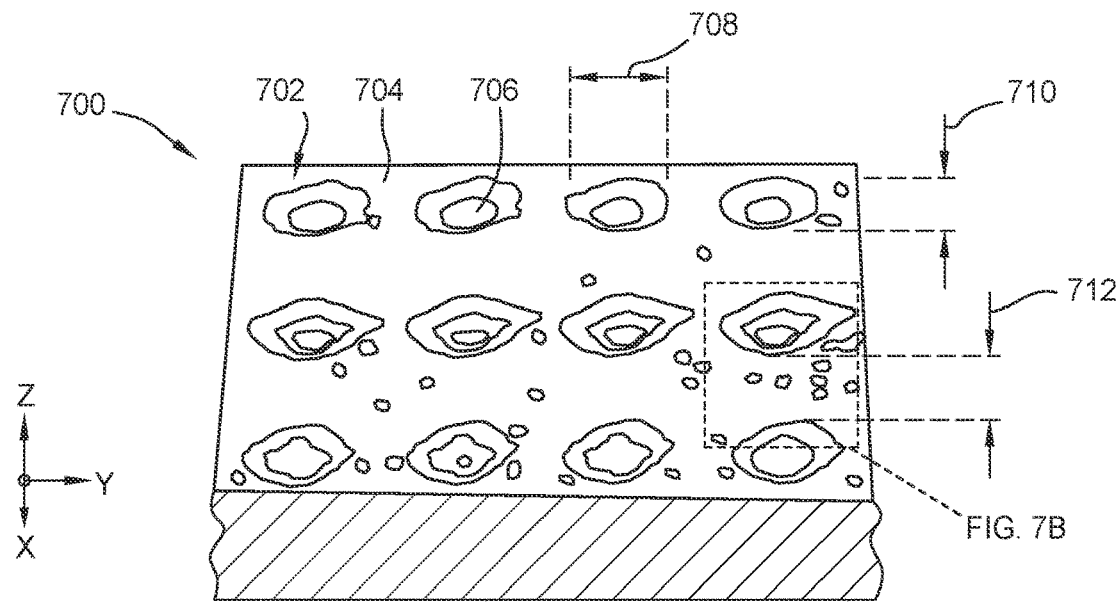
FIG. 7A is a schematic perspective sectional view of a portion of a polishing pad, according to one or more embodiments described herein.

FIG. 7A is a schematic perspective sectional view of a portion of an exemplary polishing pad 700, according to one or more embodiments described herein. FIG. 7A depicts a top surface 702 of the polishing pad 700 after regenerating the surface texture (e.g., after operation 206 of the method 200 of FIG. 2). In certain embodiments, the surface texture of the top surface 702 shown in FIG. 7A extends substantially across an entirety of the polishing pad 700. The top surface 702 of the polishing pad 700 comprises a plurality of polishing surfaces 704 having a plurality of wells 706 defined therein. The plurality of wells 706 are recessed below the top surface 702. In general, the plurality of wells 706 are used to store and distribute slurry during a polishing process. Here, the plurality of wells 706 have a circular shape when viewed from above. However, it is contemplated that the plurality of wells 706 may have any desired shape when viewed from above, including irregular shapes. Here, the wells 706 are rounded at the bottom with gently sloping sides. However, it is contemplated that the plurality of wells 706 may have any desired sectional profile when viewed from the side, including a flat bottom and/or sides. In certain embodiments, a width 708 of each of the plurality of wells 706 is about 100 μm to about 1000 μm, such as about 200 μm to about 800 μm, such as about 400 μm to about 600 μm, such as about 500 μm. In certain embodiments, a depth 710 of each of the plurality of wells 706 measured from a top of one of the plurality of polishing surfaces 704 to a bottom of an adjacent well 706 is about 20 μm to about 120 μm, such as about 40 μm to about 120 μm, such as about 60 μm to about 100 μm, such as about 60 μm. In certain embodiments, a width 712 of each of the plurality of polishing surfaces 704 is about 200 μm to about 2000 μm, such as about 400 μm to about 1600 μm, such as about 800 μm to about 1200 μm, such as about 1000 μm.

Figure 7B:
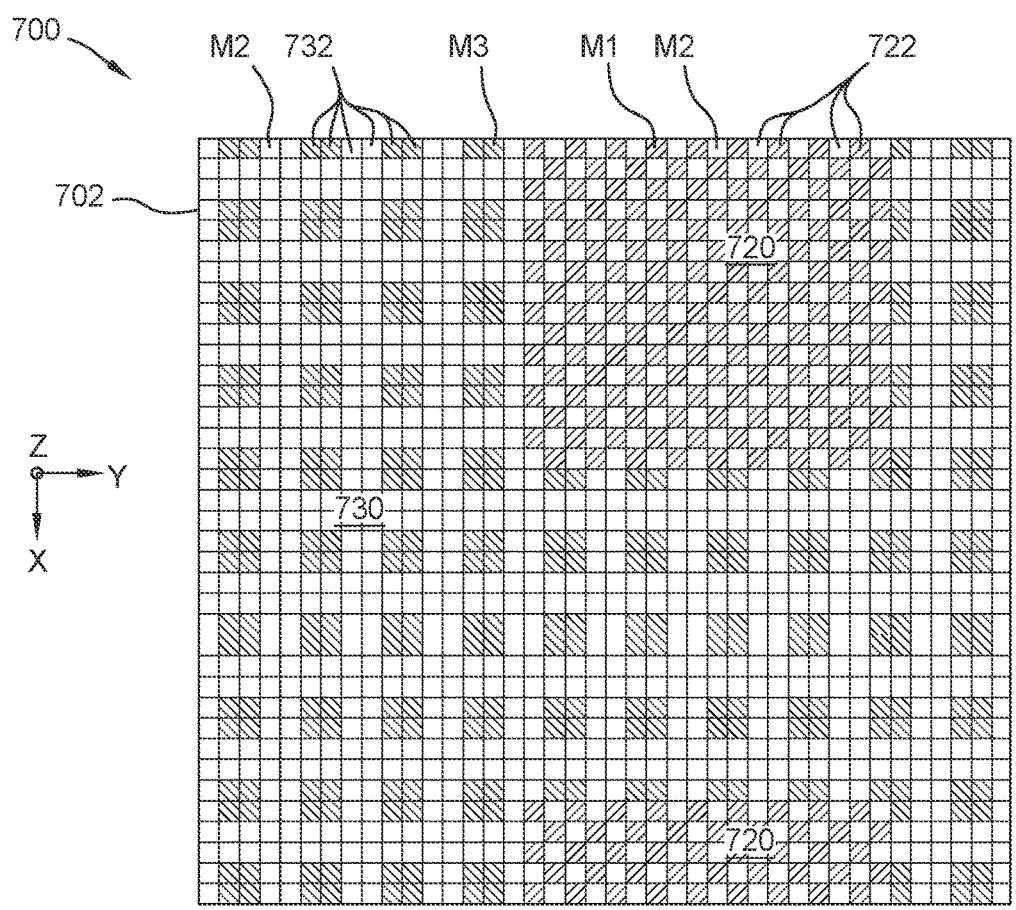
FIG. 7B is a schematic enlarged top view of a portion of a polishing pad surface of the polishing pad shown in FIG. 7A, according to one embodiment.

FIG. 7B is a schematic enlarged top view of a portion of the top surface 702 of the polishing pad 700 shown in FIG. 7A, according to one embodiment. In contrast to FIG. 7A, FIG. 7B depicts the top surface 702 of the polishing pad 700 before regenerating the surface texture (e.g., before operation 206 of the method 200 of FIG. 2). The portion of the polishing pad 700 shown in FIG. 7B features a continuous polymer phase of polishing pad material formed of a plurality of first material domains 720 and a second material domain 730. Here, the spatially arranged first material domains 720 are interposed between regions of the second material domain 730. Each of the first material domains 720 corresponds to one of the plurality of wells 706 shown in FIG. 7A. Likewise, the second material domain 730 corresponds to the plurality of polishing surfaces 704 shown in FIG. 7A. The first material domains 720 and second material domain 730 are formed from a plurality of individual sub-domains 722 and sub-domains 732, respectively, which are similar to the sub-domains described with respect to FIG. 6B. Therefore, corresponding description of the sub-domains 622, 632 of FIG. 6B is incorporated herein without limitation.

In the embodiment illustrated in FIG. 7B, the first material domains 720 and the second material domain 730 comprise mixed modulus composites in which the individual sub-domains 722, 732 have a plurality of different material compositions. Here, the first material domains 720 comprise an alternating pattern of high modulus material M1 and low modulus material M2. In contrast, the second material domain 730 comprises blocks of porogen material M3 interposed between regions of low modulus material M2.

The relative density and patterning of each of the individual sub-domains 722, 732 determines the overall storage modulus E' of each of the first and second material domains 720, 730, respectively. In some other embodiments (not shown), the first material domains 720 comprise only high modulus material M1. In certain embodiments, the high modulus material M1 has a storage modulus of about 1600 MPa measured at room temperature. In certain embodiments, the low modulus material M2 has a storage modulus of about 4 MPa measured at room temperature.

Although FIG. 7B only shows the top layer of the polishing pad 700, it is contemplated that, when viewed from the side, the polishing pad 700 may have a structure similar to that of FIG. 1B, FIG. 1C or FIG. 1D. In other words, the first and second domains 720, 730 may be uniformly stacked between layers in the vertical build plane, the first and second domains 720, 730 may be intermittently shifted and non-uniformly stacked between layers in the vertical build plane, one or more low adhesion layers may be introduced between the first and second domains 720, 730 at selected depths along the vertical build plane, or combinations thereof.

Referring to FIG. 7B, during a conditioning process with stress applied to the top surface 702 (e.g., according to operation 206 of the method 200 of FIG. 2), the first domains 720 are selectively removed while the second domain 730 is substantially retained. Selective removal of the first domains 720 results in the structure shown in FIG. 7A. It is contemplated that stress may be applied using any apparatus described herein, such as one or more apparatus described with respect to FIGS. 4A-4C.

Each of the polishing pads 600, 700 described above has at least one relativity low storage modulus E' domain (i.e., domains 620 in FIG. 6B and domain 730 in FIG. 7B) and at least one relativity high storage modulus E' domain (i.e. domain 630 in FIG. 6B and domains 720 in FIG. 7B). In both embodiments, the relatively high storage modulus E' domain is selectively removed during the conditioning process resulting in the structures shown in FIGS. 6A and 7A. Consequently, contact asperities formed on the top surfaces 602, 702 after the conditioning process have a relativity low storage modulus E' compared to the overall storage modulus E' of the polishing pad 600 and the polishing pad 700, respectively. Therefore, using apparatus and/or methods disclosed herein, it is contemplated that a bulk matrix, or scaffolding, of each of the polishing pads 600, 700 can be made relatively more rigid, while a polishing surface thereof can have distinct properties (e.g., relatively low storage modulus E'), compared to the bulk matrix, which are more favorable for contacting and polishing a substrate (e.g., less prone to scratching or causing other polishing pad induced defects).

FIG. 8A is a schematic sectional view of an additive manufacturing system which may be used to form the polishing pads described herein, according to some embodiments. Here, the additive manufacturing system 800 features a movable manufacturing support 802, a plurality of dispense heads 804 and 806 disposed above the manufacturing support 802, a curing source 808, and a system controller 810. In some embodiments, the dispense heads 804, 806 move independently of one another and independently of the manufacturing support 802 during the polishing pad manufacturing process. The first and second dispense heads 804 and 806 are fluidly coupled to corresponding first and second pre-polymer composition sources 812 and 814 which provide respective first and second pre-polymer compositions.

In some embodiments, the additive manufacturing system 800 features a third dispense head (not shown) which is fluidly coupled to a sacrificial material precursor source (e.g., a porogen material) (not shown). In some embodiments, the additive manufacturing system 800 includes as many dispense heads as desired to each dispense a different pre-polymer composition or sacrificial material precursor composition. In some embodiments, the additive manufacturing system 800 further comprises pluralities of dispense heads where two or more dispense heads are configured to dispense the same pre-polymer compositions or sacrificial material precursor compositions.

Here, each of dispense heads 804, 806 features an array of droplet ejecting nozzles 816 configured to eject droplets 830, 832 of the respective pre-polymer compositions delivered to the dispense head reservoirs. Here, the droplets 830, 832 are ejected towards the manufacturing support and thus onto the manufacturing support 802 or onto a previously formed print layer 818 disposed on the manufacturing support 802. Each of dispense heads 804, 806 is configured to fire (control the ejection of) droplets 830, 832 from each of the nozzles 816 in a respective geometric array or pattern independently of the firing other nozzles 816 thereof. Herein, the nozzles 816 are independently fired according to a droplet dispense pattern for a print layer to be formed, such as the print layer 824, as the dispense heads 804, 806 move relative to the manufacturing support 802. Once dispensed, the droplets 830, 832 are at least partially cured by exposure to electromagnetic radiation (e.g., UV radiation 826) provided by an electromagnetic radiation source, such as a UV radiation source 808 to form a print layer, such as the partially formed print layer 824.

Figure 8B:
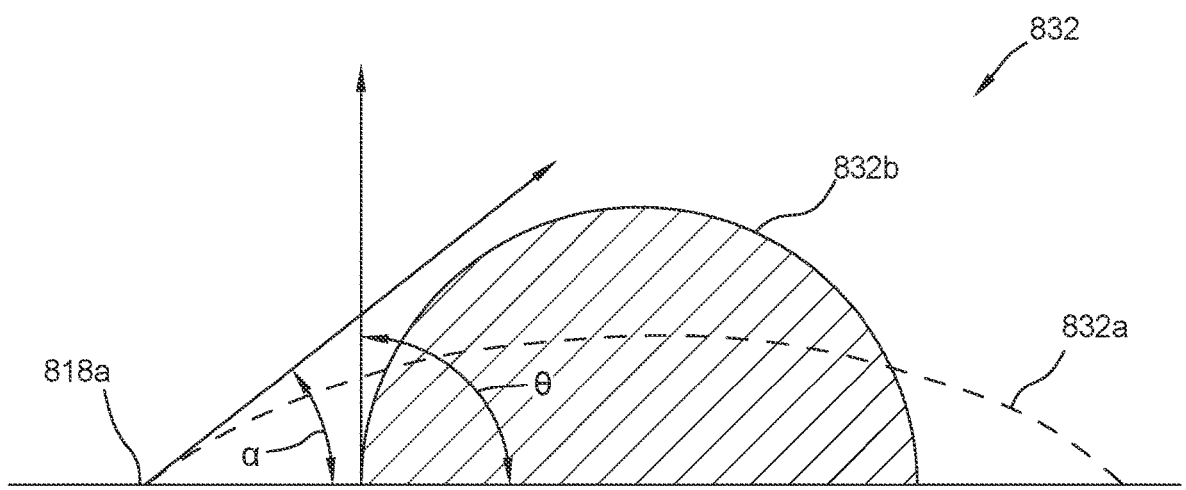
FIG. 8B is an enlarged cross-sectional view schematically illustrating a droplet disposed on a surface of a previously formed print layer, according to one or more, or a combination of, the embodiments described herein.

In some embodiments, the dispensed droplets 830, 832 are exposed to electromagnetic radiation to physically fix the droplet before it spreads to an equilibrium size such as set forth in the description of FIG. 8B. In certain embodiments, the dispensed droplets 830, 832 are exposed to electromagnetic radiation to at least partially cure the pre-polymer compositions thereof within 1 second or less of the droplet contacting a surface, such as the surface of the manufacturing support 802 or of a previously formed print layer 818 disposed on the manufacturing support 802. Often, fixing a droplet also desirably fixes the location of dispensed droplet on a surface by preventing the coalescing of the droplet with other droplets disposed adjacent thereto. Further, fixing the dispensed droplets beneficially retards or substantially prevents the diffusion of pre-polymer components across the interfacial regions of adjacently disposed droplets of different pre-polymer compositions. Thus, the intermixing of droplets of different pre-polymer compositions may be desirably controlled to provide relatively distinct material property transitions between different adjacently disposed material domains. For example, in some embodiments one or more transition regions between adjacently disposed different material domains which generally comprise some intermixing of the different precursor compositions have a width (not shown) of less than about 50 μm, such as less than about 40 μm, less than about 30 μm, less than about 20 μm, for example less than about 10 μm. It may be desirable to allow some intermixing to occur between droplets of different adjacently disposed material domains in order to improve adhesion which can inhibit or prevent fracturing from occurring at the interface.

FIG. 8B is a close up cross-sectional view schematically illustrating a droplet 832 disposed on a surface 818a of a previously formed layer, such as the previously formed layer 818 shown in FIG. 8A, according to some embodiments.

During an additive manufacturing process, a droplet of pre-polymer composition, such as the droplet 832a spreads and reaches an equilibrium contact angle α with the surface 818a of a previously formed layer within about one second from the moment in time that the droplet 832a contacts the surface 818a. The equilibrium contact angle α is a function of at least the material properties of the pre-polymer composition and the energy at the surface 818a (surface energy) of the previously formed layer (e.g., previously formed layer 818). In some embodiments, it is desirable to at least partially cure the dispensed droplet before it reaches an equilibrium size in order to fix the droplets contact angle with the surface 818a of the previously formed layer. In those embodiments, the fixed droplet's 832b contact angle θ is greater than the equilibrium contact angle α of the droplet 832a of the same pre-polymer composition which was allowed to spread to its equilibrium size.

Herein, at least partially curing the dispensed droplets 830, 832 causes the at least partial polymerization (e.g., the cross-linking) of each of the first and second pre-polymer compositions within the droplets and with adjacently disposed droplets of the same pre-polymer composition to form distinct first and second polymer domains respectively, such as the first and second material domains described herein. Further, at least partially curing the first and second pre-polymer compositions causes the at least partial copolymerization of the first and second pre-polymer compositions at the interfacial regions between adjacently disposed droplets of the first and second pre-polymer compositions. At least partial polymerization of the first and second pre-polymer compositions retards or substantially prevents the diffusion of pre-polymer components across the interfacial boundary regions of adjoining droplets of different pre-polymer composition allowing for fine control of intermixing therebetween. In other words, at least partially curing the dispensed droplets 830, 832 causes the at least partial polymerization of the first and second pre-polymer compositions within the droplets, the at least partial co-polymerization of the first and second pre-polymer compositions between adjacently disposed droplets, and the at least partial polymerization or co-polymerization between the droplets 830, 832 and the at the least partially cured material of the previously formed print layer 818 adjacently disposed there below.

In some embodiments, which may be combined with other embodiments described herein, the first and second pre-polymer compositions each comprise a mixture of one or more of functional polymers, functional oligomers, functional monomers, reactive diluents, and photoinitiators.

Examples of suitable functional polymers which may be used to form one or both of the at least two pre-polymer compositions include multifunctional acrylates including di, tri, tetra, and higher functionality acrylates, such as 1,3,5-triacryloylhexahydro-1,3,5-triazine or trimethylolpropane triacrylate.

Examples of suitable functional oligomers which may be used to form one or both of the at least two pre-polymer compositions include monofunctional and multifunctional oligomers, acrylate oligomers, such as aliphatic urethane acrylate oligomers, aliphatic hexafunctional urethane acrylate oligomers, diacrylate, aliphatic hexafunctional acrylate oligomers, multifunctional urethane acrylate oligomers, aliphatic urethane diacrylate oligomers, aliphatic urethane acrylate oligomers, aliphatic polyester urethane diacrylate blends with aliphatic diacrylate oligomers, or combinations thereof, for example bisphenol-A ethoxylate diacrylate or polybutadiene diacrylate, tetrafunctional acrylated polyester oligomers, and aliphatic polyester based urethane diacrylate oligomers.

Examples of suitable monomers which may be used to from one or both of the at least two pre-polymer compositions include both mono-functional monomers and multifunctional monomers. Suitable mono-functional monomers include tetrahydrofurfuryl acrylate (e.g., SR285 from Sartomer®), tetrahydrofurfuryl methacrylate, vinyl caprolactam, isobornyl acrylate, isobornyl methacrylate, 2-phenoxyethyl acrylate, 2-phenoxyethyl methacrylate, 2-(2-ethoxyethoxy)ethyl acrylate, isooctyl acrylate, isodecyl acrylate, isodecyl methacrylate, lauryl acrylate, lauryl methacrylate, stearyl acrylate, stearyl methacrylate, cyclic trimethylolpropane formal acrylate, 2-[[(Butylamino) carbonyl]oxy]ethyl acrylate (e.g., Genomer 1122 from RAHN USA Corporation), 3,3,5-trimethylcyclohexane acrylate, or mono-functional methoxylated PEG (350) acrylate. Suitable multifunctional monomers include diacrylates or dimethacrylates of diols and polyether diols, such as propoxylated neopentyl glycol diacrylate, 1,6-hexanediol diacrylate, 1,6-hexanediol dimethacrylate, 1,3-butylene glycol diacrylate, 1,3-butylene glycol dimethacrylate 1,4-butanediol diacrylate, 1,4-butanediol dimethacrylate, alkoxylated aliphatic diacrylate (e.g., SR9209A from Sartomer®), diethylene glycol diacrylate, diethylene glycol dimethacrylate, dipropylene glycol diacrylate, tripropylene glycol diacrylate, triethylene glycol dimethacrylate, alkoxylated hexanediol diacrylates, or combinations thereof, for example SR562, SR563, SR564 from Sartomer®.

The reactive diluents used to form one or more of the at least two different pre-polymer compositions are least monofunctional, and undergo polymerization when exposed to free radicals, Lewis acids, and/or electromagnetic radiation. Examples of suitable reactive diluents include monoacrylate, 2-ethylhexyl acrylate, octyldecyl acrylate, cyclic trimethylolpropane formal acrylate, caprolactone acrylate, isobornyl acrylate (IBOA), or alkoxylated lauryl methacrylate.

Examples of suitable photoinitiators used to form one or more of the at least two different pre-polymer compositions include polymeric photoinitiators and/or oligomer photoinitiators, such as benzoin ethers, benzyl ketals, acetyl phenones, alkyl phenones, phosphine oxides, benzophenone compounds and thioxanthone compounds that include an amine synergist, or combinations thereof.

Examples of polishing pad materials formed of the pre-polymer compositions described above may include at least one of oligomeric or polymeric segments, compounds, or materials selected from the group consisting of: polyamides, polycarbonates, polyesters, polyether ketones, polyethers, polyoxymethylenes, polyether sulfone, polyetherimides, polyimides, polyolefins, polysiloxanes, polysulfones, polyphenylenes, polyphenylene sulfides, polyurethanes, polystyrene, polyacrylonitriles, polyacrylates, polymethylmethacrylates, polyurethane acrylates, polyester acrylates, polyether acrylates, epoxy acrylates, polycarbonates, polyesters, melamines, polysulfones, polyvinyl materials, acrylonitrile butadiene styrene (ABS), halogenated polymers, block copolymers, and random copolymers thereof, and combinations thereof.

Some embodiments described herein further include pore forming features formed of a sacrificial material (e.g., a water soluble material, such as glycols (e.g., polyethylene glycols), glycol-ethers, and amines). Examples of suitable sacrificial material precursors which may be used to form the pore forming features described herein include ethylene glycol, butanediol, dimer diol, propylene glycol-(1,2) and propylene glycol-(1,3), octane-1,8-diol, neopentyl glycol, cyclohexane dimethanol (1,4-bis-hydroxymethylcyclohexane), 2-methyl-1,3-propane diol, glycerine, trimethylolpropane, hexanediol-(1,6), hexanetriol-(1,2,6) butane triol-(1,2,4), trimethylolethane, pentaerythritol, quinitol, mannitol and sorbitol, methylglycoside, also diethylene glycol, triethylene glycol, tetraethylene glycol, polyethylene glycols, dibutylene glycol, polybutylene glycols, ethylene glycol, ethylene glycol monobutyl ether (EGMBE), diethylene glycol monoethyl ether, ethanolamine, diethanolamine (DEA), triethanolamine (TEA), and combinations thereof.

In some embodiments, the sacrificial material precursor comprises a water soluble polymer, such as 1-vinyl-2-pyrrolidone, vinylimidazole, polyethylene glycol diacrylate, acrylic acid, sodium styrenesulfonate, Hitenol BC10®, Maxemul 6106®, hydroxyethyl acrylate and [2-(methacryloyloxy)ethyl]trimethylammonium chloride, 3-allyloxy-2-hydroxy-1-propanesulfonic acid sodium, sodium 4-vinylbenzenesulfonate, [2-(methacryloyloxy)ethyl]dimethyl-(3-sulfopropyl)ammonium hydroxide, 2-acrylamido-2-methyl-1-propanesulfonic acid, vinylphosphonic acid, allyltriphenylphosphonium chloride, (vinylbenzyl)trimethylammonium chloride, allyltriphenylphosphonium chloride, (vinylbenzyl)trimethylammonium chloride, E-SPERSE RS-1618, E-SPERSE RS-1596, methoxy polyethylene glycol monoacrylate, methoxy polyethylene glycol diacrylate, methoxy polyethylene glycol triacrylate, or combinations thereof.

The additive manufacturing system 800 shown in FIG. 8A further includes the system controller 810 to direct the operation thereof. The system controller 810 includes a programmable central processing unit (CPU) 834 which is operable with a memory 835 (e.g., non-volatile memory) and support circuits 836. The support circuits 836 are conventionally coupled to the CPU 834 and comprise cache, clock circuits, input/output subsystems, power supplies, and the like, and combinations thereof coupled to the various components of the additive manufacturing system 800, to facilitate control thereof. The CPU 834 is one of any form of general purpose computer processor used in an industrial setting, such as a programmable logic controller (PLC), for controlling various components and sub-processors of the additive manufacturing system 800. The memory 835, coupled to the CPU 834, is non-transitory and may be one or more of readily available memories such as random access memory (RAM), read only memory (ROM), floppy disk drive, hard disk, or any other form of digital storage, local or remote.

The memory 835 is in the form of a computer-readable storage media containing instructions (e.g., non-volatile memory), which when executed by the CPU 834, facilitates the operation of the manufacturing system 800. The instructions in the memory 835 are in the form of a program product such as a program that implements the methods of the present disclosure.

The program code may conform to any one of a number of different programming languages. In one example, the disclosure may be implemented as a program product stored on computer-readable storage media for use with a computer system. The program(s) of the program product define functions of the embodiments (including the methods described herein).

Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the methods described herein, are embodiments of the present disclosure. In some embodiments, the methods set forth herein, or portions thereof, are performed by one or more application specific integrated circuits (ASICs), field-programmable gate arrays (FPGAs), or other types of hardware implementations. In some other embodiments, the polishing pad manufacturing methods set forth herein are performed by a combination of software routines, ASIC(s), FPGAs and, or, other types of hardware implementations.

The system controller 810 directs the motion of the manufacturing support 802, the motion of the dispense heads 804 and 806, the firing of the nozzles 816 to eject droplets of pre-polymer compositions therefrom, and the degree and timing of the curing of the dispensed droplets provided by the UV radiation source 808. In some embodiments, the instructions used by the system controller to direct the operation of the manufacturing system 800 include droplet dispense patterns for each of the print layers to be formed. In some embodiments, the droplet dispense patterns are collectively stored in the memory 835 as CAD-compatible digital printing instructions.

Figure 9:
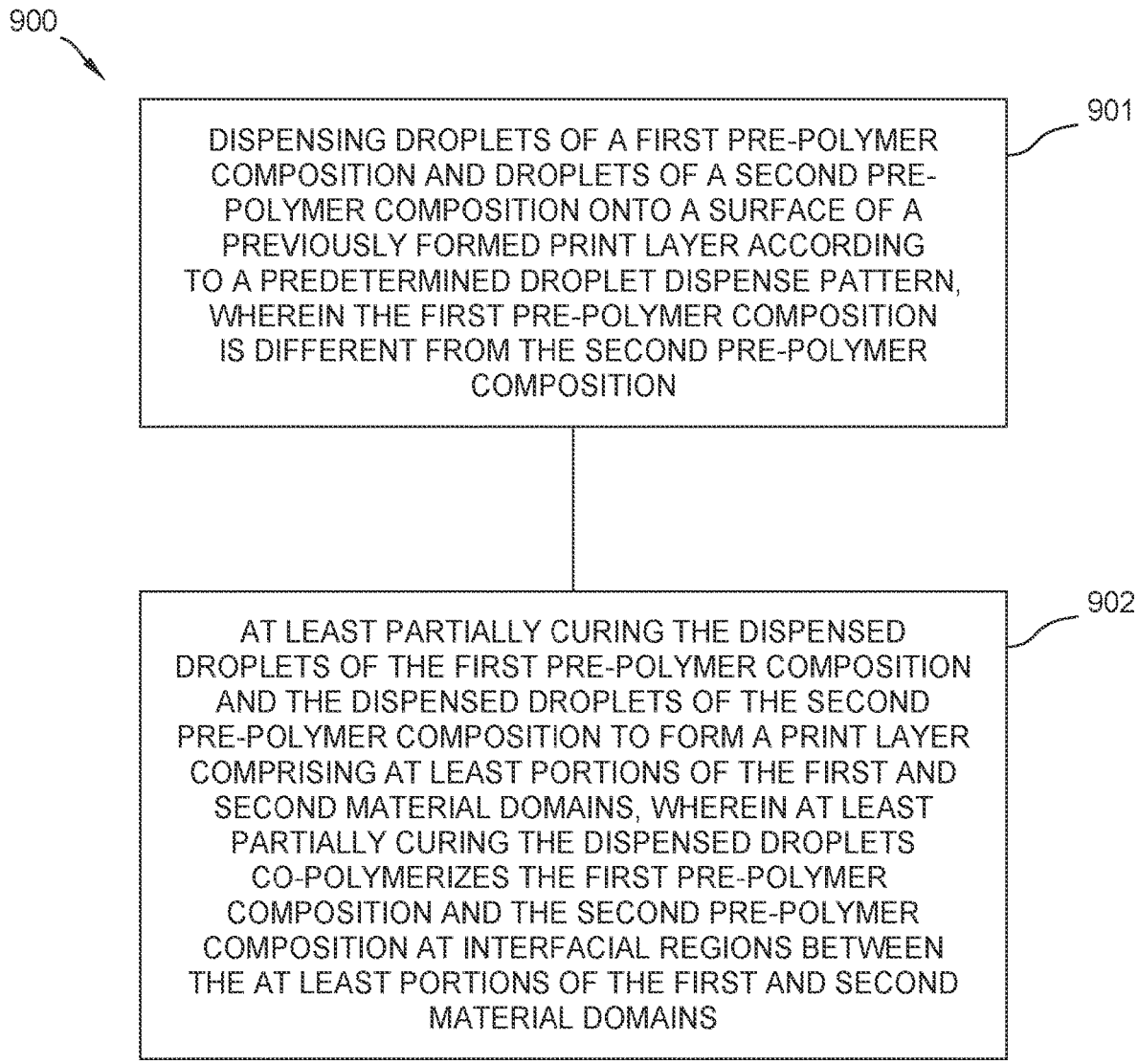
FIG. 9 is a diagram setting forth a method of forming a print layer of a polishing pad according to one or more embodiments.

FIG. 9 is a flow diagram setting forth a method of forming a print layer of a polishing pad according to one or more embodiments. Embodiments of the method 900 may be used in combination with one or more of the systems and system operations described herein, such as the additive manufacturing system 800 of FIG. 8A and the fixed droplets of FIG. 8B. Further, embodiments of the method 900 may be used to form any one or combination of the 3D printed structures or polishing pads shown and described herein.

At operation 901 the method 900 includes dispensing droplets of a first pre-polymer composition and droplets of a second pre-polymer composition onto a surface of a previously formed print layer according to a predetermined droplet dispense pattern. Here the first pre-polymer composition is different from the second pre-polymer composition. For example, in some embodiments, the first pre-polymer composition includes one or more monomers or oligomers which are different from the monomers or oligomers used to form the second pre-polymer composition.

At operation 902 the method 900 includes at least partially curing the dispensed droplets of the first pre-polymer composition and the dispensed droplets of the second pre-polymer composition to form a print layer comprising at least portions of one or more first material domains and a plurality of second material domains. Here, at least partially curing the dispensed droplets co-polymerizes the first pre-polymer composition and the second pre-polymer composition at interfacial regions between the one or more first material domains and the plurality of second material domains to form a continuous polymer phase of polishing material. The one or more first material domains and the second material domains comprise a difference in one or more material properties from one another.

In some embodiments, the method 900 further includes sequential repetitions of operations 901 and 902 to form a plurality of print layers stacked in the z-direction (i.e., a direction orthogonal to the surface of the manufacturing support or a previously formed print layer disposed thereon).

The predetermined droplet dispense pattern used to form each print layer may be the same or different as a predetermined droplet dispense pattern used to form a previous print layer disposed there below. In some embodiments, the method 900 further includes dispensing droplets of a sacrificial material or a sacrificial material precursor according to a predetermined droplet dispense pattern to form at least portions of a plurality of spatially arranged pore forming features in one or more sequentially formed print layers.

The methods described herein beneficially provide for the manufacturing of structures (e.g., polishing pads) having controlled and repeatable spatially arranged material domains comprising different material properties therebetween. The ability to spatially arrange material domains allows for the repeatable and controlled manufacture of structures (e.g., polishing pads) having a surface texture which can be regenerated in situ.

While the foregoing is directed to embodiments of the present disclosure, other and further embodiments of the disclosure may be devised without departing from the basic scope thereof, and the scope thereof is determined by the claims that follow.

The invention claimed is:

1. A structure formed from a plurality of printed layers, the structure comprising:
    a plurality of printed layers stacked in a first direction, each of the plurality of printed layers comprising:
        a first material domain extending in the first direction and having a first material composition; and
        a plurality of second material domains extending in the first direction and having a second material composition different from the first material composition, wherein:
            a plurality of features are formed in the plurality of second material domains from a top surface of the structure, and
            a portion of the second material domains having a depth corresponding to a depth of the plurality of features is configured to be removed selectively to the first material domain when an equivalent force is applied to the top surface of the structure.

2. The structure of claim 1, wherein the first and second material compositions have different material properties.

3. The structure of claim 1, wherein the first and second material compositions have different cohesion between molecules of the same material and adhesion between molecules of different materials.

4. The structure of claim 1, wherein the plurality of second material domains are interposed between regions of the first material domain.

5. The structure of claim 1, wherein each of the first and second material domains comprises a plurality of sub-domains corresponding to a single droplet deposited during an additive manufacturing process.

6. The structure of claim 1, wherein the structure comprises a polishing pad, and wherein the top surface thereof is a polishing surface of the polishing pad.

7. The structure of claim 1, wherein the structure is configured to be utilized in at least one application selected from the group consisting of chemical mechanical polishing, precision optics, metal polish, advanced contact surface clean, tissue engineering, textured anti-microbial surfaces, and drug delivery systems.

8. A structure formed from a plurality of printed layers, the structure comprising:
    a plurality of printed layers stacked in a first direction, each of the plurality of printed layers comprising:
        a first material domain extending in the first direction and comprising a first plurality of sub-domains having a first material formulation; and
        a second material domain extending in the first direction and comprising a second plurality of sub-domains having a second material formulation different from the first material formulation, wherein:
            a plurality of features are formed in the second material domain, and
            at least a portion of the second material domain having a depth corresponding to a depth of the plurality of features is configured to be selectively removed by a process or force applied to a top surface of the structure at a different rate than the first material domain to regenerate a surface texture on the top surface.

9. The structure of claim 8, wherein the first and second material formulations differ in at least one of material composition, relative concentration, or distribution within the respective material domains.

10. The structure of claim 8, further comprising a third material domain comprising a third plurality of sub-domains having a third material formulation different from the first and second material formulations.

11. The structure of claim 10, wherein the plurality of printed layers are stacked in a first direction, and wherein the third material domain comprises an adhesion layer oriented orthogonal to the first direction.

12. The structure of claim 11, wherein the adhesion layer is configured to separate from surrounding layers of the plurality of printed layers to help control a depth of removal of the first and second material domains.

* * * * *